(12) United States Patent
Poole et al.

(10) Patent No.: US 10,043,175 B2
(45) Date of Patent: *Aug. 7, 2018

(54) ENHANCED NEAR FIELD COMMUNICATIONS ATTACHMENT

(71) Applicant: Capital One Financial Corporation, McLean, VA (US)

(72) Inventors: Thomas S. Poole, Chantilly, VA (US); Paul Young Moreton, Glen Allen, VA (US); Hutch Douglas, McLean, VA (US); Anthony Swider, III, Deckersville, MI (US); Thomas Christopher Clarke, Alexandria, VA (US)

(73) Assignee: CAPITAL ONE FINANCIAL CORPORATION, McLean, VA (US)

( * ) Notice: Subject to any disclaimer, the term of this patent is extended or adjusted under 35 U.S.C. 154(b) by 290 days.

This patent is subject to a terminal disclaimer.

(21) Appl. No.: 14/966,656

(22) Filed: Dec. 11, 2015

(65) Prior Publication Data

US 2016/0132862 A1    May 12, 2016

Related U.S. Application Data

(63) Continuation of application No. 14/790,126, filed on Jul. 2, 2015, now abandoned, which is a continuation
(Continued)

(51) Int. Cl.
*G06Q 20/32* (2012.01)
*H04W 4/80* (2018.01)
(Continued)

(52) U.S. Cl.
CPC ....... *G06Q 20/3278* (2013.01); *G06F 9/5061* (2013.01); *G06K 19/077* (2013.01);
(Continued)

(58) Field of Classification Search
CPC ... H04B 5/0025–5/0031; H04B 5/0056; H04B 5/02; G06Q 20/3278; G06Q 20/3226
See application file for complete search history.

(56) References Cited

U.S. PATENT DOCUMENTS

| 4,062,635 A | 12/1977 | Teh-Sheng | |
| 2005/0278547 A1* | 12/2005 | Hyndman | G06F 21/35 713/185 |

(Continued)

OTHER PUBLICATIONS

Notification of Transmittal of The International Search Report and The Written Opinion of the International Searching Authority from Application No. PCT/US2015/32931 dated Oct. 28, 2015.

*Primary Examiner* — Gennadiy Tsvey
(74) *Attorney, Agent, or Firm* — Troutman Sanders LLP; Christopher J. Forstner; John A. Morrissett

(57) ABSTRACT

A secure fob that enables a user to pay for an item or items without needing to present a mobile device. A secure fob may include a proximity capability to ensure that a mobile device is within a particular range, thereby eliminating the risk of fraudulent charges on a stolen fob. In such an embodiment, a fob may be disabled if the fob is not paired with the mobile device by virtue of being disconnected and/or physically separated from the mobile device. The secure fob also may include enhanced features to authorize transactions and locate the mobile device and/or the secure fob.

14 Claims, 17 Drawing Sheets

Related U.S. Application Data of application No. 14/290,347, filed on May 29, 2014, now Pat. No. 9,105,025, which is a continuation-in-part of application No. 13/538,468, filed on Jun. 29, 2012, now Pat. No. 9,183,491, which is a continuation of application No. 13/441,505, filed on Apr. 6, 2012, now Pat. No. 9,183,490.

(60) Provisional application No. 61/570,275, filed on Dec. 13, 2011, provisional application No. 61/547,910, filed on Oct. 17, 2011.

(51) Int. Cl.
| | | |
|---|---|---|
| *H04B 5/00* | (2006.01) | |
| *G06F 9/50* | (2006.01) | |
| *H04L 29/06* | (2006.01) | |
| *H04W 12/06* | (2009.01) | |
| *G06K 19/077* | (2006.01) | |
| *G06Q 20/36* | (2012.01) | |
| *G06Q 20/38* | (2012.01) | |
| *G06Q 20/40* | (2012.01) | |
| *G06Q 30/02* | (2012.01) | |
| *G06Q 30/06* | (2012.01) | |
| *G06K 19/07* | (2006.01) | |

(52) U.S. Cl.
CPC ... *G06K 19/0727* (2013.01); *G06K 19/07701* (2013.01); *G06K 19/07707* (2013.01); *G06K 19/07715* (2013.01); *G06Q 20/32* (2013.01); *G06Q 20/322* (2013.01); *G06Q 20/3224* (2013.01); *G06Q 20/3226* (2013.01); *G06Q 20/3227* (2013.01); *G06Q 20/367* (2013.01); *G06Q 20/382* (2013.01); *G06Q 20/3821* (2013.01); *G06Q 20/40* (2013.01); *G06Q 20/405* (2013.01); *G06Q 30/0241* (2013.01); *G06Q 30/06* (2013.01); *H04B 5/0031* (2013.01); *H04L 63/0861* (2013.01); *H04L 63/10* (2013.01); *H04L 63/102* (2013.01); *H04W 4/80* (2018.02); *H04W 12/06* (2013.01); *H04L 2463/102* (2013.01)

(56) References Cited

U.S. PATENT DOCUMENTS

| | | |
|---|---|---|
| 2007/0155430 A1 | 7/2007 | Cheon et al. |
| 2007/0188323 A1 | 8/2007 | Sinclair et al. |
| 2008/0011837 A1 | 1/2008 | Wesley |
| 2008/0019131 A1 | 1/2008 | Takei et al. |
| 2008/0128505 A1 | 6/2008 | Challa |
| 2008/0150679 A1 | 6/2008 | Bloomfield |
| 2008/0162361 A1 | 7/2008 | Sklovsky et al. |
| 2008/0183559 A1 | 7/2008 | Frazier et al. |
| 2008/0224825 A1 | 9/2008 | Nystrom et al. |
| 2008/0238610 A1 | 10/2008 | Rosenberg |
| 2009/0069050 A1 | 3/2009 | Jain et al. |
| 2009/0144456 A1 | 6/2009 | Gelf et al. |
| 2009/0266884 A1 | 10/2009 | Killian et al. |
| 2009/0307140 A1 | 12/2009 | Mardikar |
| 2010/0125508 A1 | 5/2010 | Smith |
| 2010/0151790 A1 | 6/2010 | Hoeksel et al. |
| 2010/0184479 A1 | 7/2010 | Griffin, Jr. |
| 2011/0312270 A1 | 12/2011 | White |
| 2012/0214443 A1* | 8/2012 | Daigle ............... H04L 9/3228 455/411 |
| 2012/0246079 A1 | 9/2012 | Wilson et al. |
| 2013/0103847 A1 | 4/2013 | Brown et al. |
| 2013/0191227 A1 | 7/2013 | Pasa et al. |
| 2013/0203346 A1 | 8/2013 | Han |
| 2013/0246259 A1 | 9/2013 | Dessert |
| 2013/0288598 A1 | 10/2013 | Parkin |
| 2014/0073262 A1 | 3/2014 | Gutierrez et al. |
| 2014/0074698 A1 | 3/2014 | Poole et al. |

* cited by examiner

ENHANCED NEAR FIELD COMMUNICATIONS ATTACHMENT

CROSS REFERENCE TO RELATED APPLICATION

The subject application is a Continuation Application of U.S. application Ser. No. 14/790,126, filed on Jul. 2, 2015, now abandoned, which is a Continuation Application of U.S. application Ser. No. 14/290,347, filed May 29, 2014, now U.S. Pat. No. 9,105,025, which is a continuation-in-part application of U.S. application Ser. No. 13/538,468, filed Jun. 29, 2012, now U.S. Pat. No. 9,183,491, which is a continuation application of U.S. application Ser. No. 13/441,505, filed Apr. 6, 2012, now U.S. Pat. No. 9,183,490, which claims priority to U.S. Provisional Application Nos. 61/570,275, filed Dec. 13, 2011, and 61/547,910, filed Oct. 17, 2011, the contents of which are incorporated herein by reference in their entireties.

FIELD OF THE DISCLOSURE

The present disclosure relates to systems and methods for providing enhanced features for contactless payment with a Near Field Communications attachment.

BACKGROUND OF THE DISCLOSURE

Near Field Communications, or NFC, allows for wireless communication between two devices in close proximity to each other. Existing NFC devices provide limited functionality for contactless payments using a "digital wallet," but are restrictive and difficult to implement for a number of reasons.

Current digital wallet solutions require channeling all transactions through a defined group of stakeholders, thus increasing cost and complexity of each transaction. Further, current digital wallet solutions require that a mobile device be pre-manufactured with specific hardware already included, thus excluding hundreds of millions of existing devices from using a digital wallet solution.

Moreover, current proximity attachments, such as key finders or fobs, provide a proximity "attachment", enabling a proximity connection to, for example, a mobile device. But these key finders do not have payment capabilities. The key finders also are not tied to bank security.

These and other drawbacks exist.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION OF THE EMBODIMENTS

Figure 1:
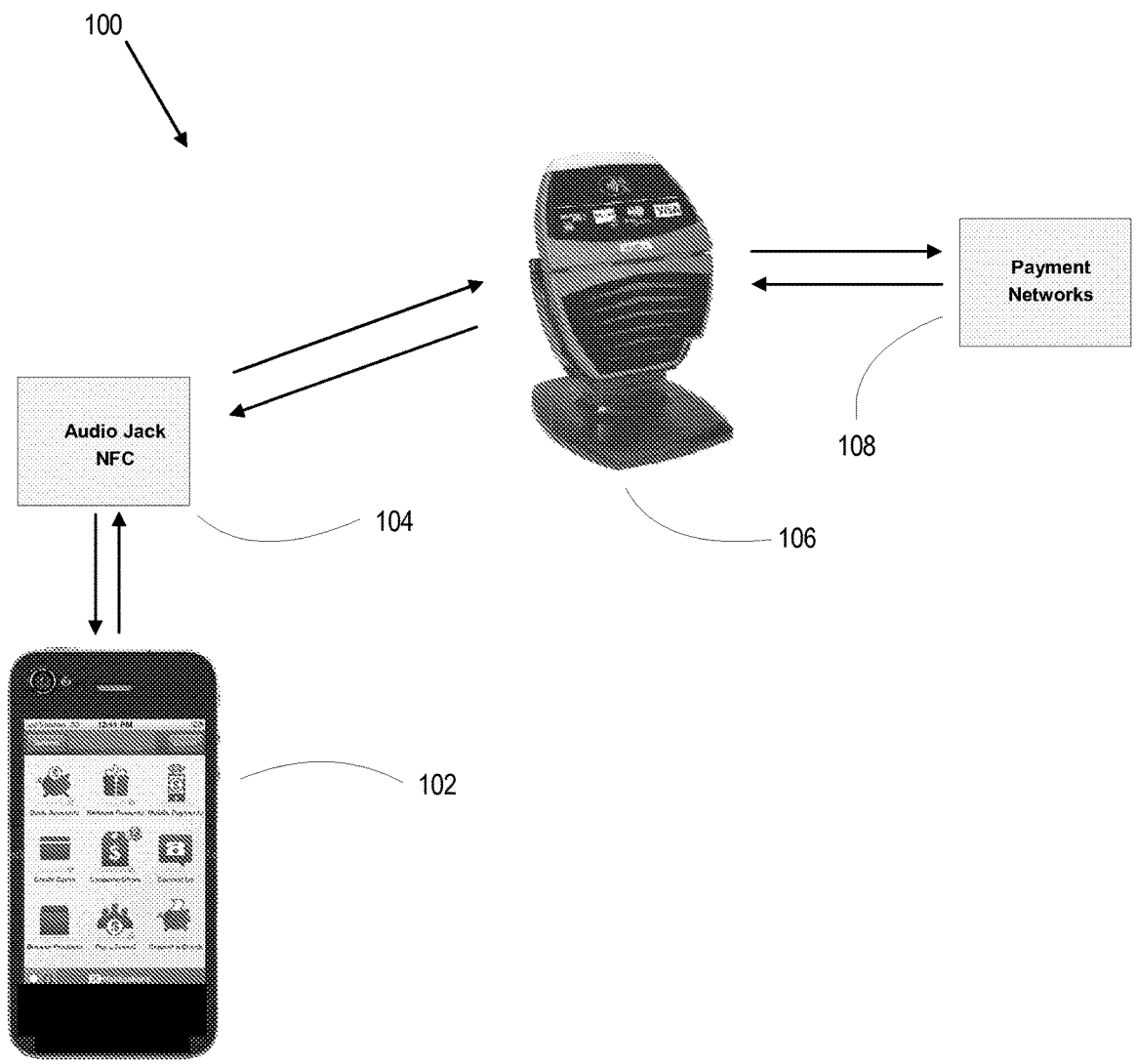
FIG. 1 depicts an exemplary embodiment of a contactless payment system.

The following description is intended to convey a thorough understanding of the embodiments described by providing a number of specific exemplary embodiments and details involving systems and methods for providing contactless payment with a NFC attachment. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in various embodiments, depending on specific design and other needs. A financial institution and system supporting a financial institution are used as examples for the disclosure. The disclosure is not intended to be limited to financial institutions only.

According to the various embodiments of the present disclosure, systems and methods enable an approach to contactless payments using an attachment to a mobile device. Such attachments may include, for example and not by way of limitation, a contactless payment attachment that plugs into an audio jack or plug of a mobile device, and/or a fob that connects to a mobile device, and/or the like. The exemplary use of "mobile device" throughout the application is only by way of example, and the attachment may also be used with personal computers, automobiles, televisions, gaming systems, or any other device capable of making an audio jack connection. The attachment may also plug into any jack of a mobile device capable of transmitting audio and/or data information, for instance, a 2.5 mm audio jack, a 3.5 mm or ⅛ inch audio jack, a multipronged audio jack, or other audio connection. The attachment may also utilize various other connections available on mobile devices, for example, mini-USB, micro-USB, memory card slots, proprietary ports such as, for example, a dock connector on a mobile device, (e.g. the dock connector on an Apple iPhone®, iPod® or iPad®), and/or low energy wireless connections such as, e.g., Bluetooth® Low Energy Technology. In various embodiments, the attachment approach to contactless payment could be provided in an online environment, whereby, for example, a mobile device (such as a smartphone, audio player, tablet, or other mobile device) with an attachment according to the various embodiments could send and receive data via a communication network sufficient to enable a contactless transaction, including a contactless payment transaction. The attachment could also be used in an offline manner, whereby an attachment could connect to the mobile device alone and used, regardless of whether the mobile device is connected to a communication network at the time of use. This attachment could eliminate the need for a consumer to purchase a mobile device with special hardware, enable a user to quickly and cost-effectively add contactless payment features to their mobile device, and/or enable a user or financial institution to bypass traditional stakeholders in the payment process.

The attachment may be, for example and not by way of limitation, an audio plug/jack based attachment for mobile devices, smartphones, or other personal digital assistants (e.g. tablet computers, music players, etc.) In one embodiment, this attachment may be operable with any mobile device, PDA class device or smartphone that includes an audio jack or plug. The mobile device may run software or firmware (for example, an 'app') that works with the dongle to enable mobile payments. The attachment may perform similar functions to existing digital wallet solutions without the trouble of strict hardware requirements or needing to use a specific intermediary for a transaction. The attachment may provide a pass-through or other addition to provide traditional audio functionality (music, calling, etc.) while the attachment is in use. In some embodiments, the attachment may allow the pass-through audio signal to be suspended or terminated during use of the NFC portion of the attachment.

In an exemplary embodiment, the attachment may be either self-powered or powered by the mobile device that it may be attached or otherwise connected to. For example, the attachment may include a battery, such as, for example, a small coin cell battery which may enable enhanced functions associated with the attachment. The attachment also may derive power from the mobile device through the audio jack. In one embodiment, the attachment may plug into or otherwise connect to a personal computer or other source for initial provisioning of payment credentials. For example, the attachment may connect to a mobile device and/or personal computer via a short range wireless connection such as a Bluetooth® Low Energy Technology connection. In an embodiment, NFC secure element provisioning may occur prior to issuance of the attachment. For example, a user may provision an attachment once the attachment is obtained by the user. A user may contact a financial institution, who will then activate the attachment. The attachment may be activated by standard methods, including but not by way of limitation, using a trusted service manager (TSM), Know Your Customer (KYC), through the mobile device, over the phone, or other provisioning process. In one embodiment, the provisioning may be completed before the user obtains the attachment. Additionally, the attachment may be provisioned for multiple financial accounts. This may be completed by provisioning the device to store each account or by using the mobile device to re-provision the attachment each time a purchase is desired with a different account. The provisioning process may securely pass encrypted credit card details or other credentials to the secure element, such as the credit card account number, expiration date, and other track data.

Also, an attachment may be provisioned for credit cards, debit cards, prepaid cards, or any other payment vehicle available to customers, companies, or financial institutions. The attachment also may be provisioned to store other valuable data, such as, for example, health credentials and other like personal information. The attachment may be provisioned with or without user interaction, by the customer or financial institution, and any other acceptable method of provisioning. The attachment may be provisioned "over-the-air" or via a wireless or wired connection. The provisioning may occur by receiving a signal from a trusted service manager (TSM).

In an exemplary embodiment, the attachment may contain an NFC antenna and secure element (SE). The SE may be a hardware chip specially designed to be tamper proof. In one embodiment, the SE may be used for digitally and physically secure storage of sensitive data, including payment data, health records, car key identifiers, etc. The SE may, for example, store information related to a person, customer, financial institution, or other entity. In certain implementations, the SE may also store information related to a financial account, such as, for example, a credit card number, debit account number, or other account identifier. The SE may include a computer processor or other computational hardware or software. As one example, the secure element may contain the Visa® and MasterCard® applications for PayWave® and PayPass® transactions.

The Secure Element may have the ability to securely store various credentials. In one embodiment, the credentials may comprise credit card information. The credentials may expand beyond credit card payment info for use over NFC. As one example, the information stored on the Secure Element may be used to auto-complete on-line checkouts or enable purchases in other, third party applications. The Secure Element may also store keys, building access information, drivers licenses, passwords, loyalty card information, gift card information, transaction history, reward information, ATM access information, addresses, documents, pictures, or other data objects. The secure element may be capable of generating a Dynamic Card Security Code, such as a Dynamic Card Verification Value (CVV3) or other security code.

The attachment may also take on multiple different form factors, including but not by way of limitation, those forms that have sufficient space for company branding or logos. The attachment may take any shape capable of acting as an attachment. The attachment may be made as small as possible to be unobtrusive, or be made to have one or more dimensions similar to the mobile device it is attached to. In an exemplary embodiment, the attachment may be square or have any other shape or ornamental design.

In an exemplary embodiment, the attachment may include software and application programming interfaces (APIs) to enable remote and local provisioning of the SE, use of NFC antenna, payments enablement, and attachment security management (e.g. long range deactivation). In an exemplary embodiment, the system may include a user interface and software for an associated user access to uses of the SE, the NFC antenna, and any other portion of the attachment for use in any manner of application desired by user or intended for by issuer. The system and software may allow for multiple cards, accounts, or other information portions to be stored in the secure element and may allow simultaneous access to all, or switch between the individual options.

In an embodiment, the system may include an application and/or user interface that enables end user control for NFC transmission of payment data through an audio plug. The application may operate on the mobile device or on an external controller or device. Also, the system may include APIs that allow access to the NFC antenna and secure element for enabling, disabling, locking, initial provisioning, updates, emergency turnoff, and other operations. The attachment may be provisioned to store information for multiple accounts, multiple cards, loyalty cards, or any other financial information. The attachment may require a payment initiation action enable the attachment for use. For example, the attachment may require a user to enter a PIN code or other identifying information to enable the attachment for user. Additionally, the attachment may stay 'unlocked' and a payment initiation action may comprise a user bumping, touching, or otherwise holding or positioning the device near a sensor. The attachment may then 'lock' after use or after a certain time after enabling. In one exemplary embodiment, the attachment may provide a physical switch, button, or other way to enable or unlock the attachment. For example and not by way of limitation, a user may press a button and enter a PIN code in order to activate or unlock the attachment. Additionally, the physical switch or button may be used in place of a PIN code or other functionality. Additionally, the device may use any other type of unlocking or enabling the attachment, for example and not by way of limitation a physical gesture, touch, or swipe motion by a user. Also, the system may permit the use of a cryptographic protocol (e.g. secure sockets layer) to establish a secure channel for data transmission. Upon a transaction, the attachment may transmit information regarding the transaction through the audio jack to the mobile device.

The application and user interface may leverage transaction data gained from the attachment, wireless data connection, over-the-air data connection, or other means of data transmission. For example, the application and user interface may leverage information about the products and/or services being purchased, information about the account or the account holder, information about the merchant and/or other parties involved in a transaction, rewards information, promotional information, advertising information, or other useful information.

In an exemplary embodiment, the system may provide capability to securely enable an attachment through hardware identifiers like the UDID (e.g. device ID on an Apple iPhone or other mobile device). For example, upon obtaining an attachment, a user may 'pair' that attachment with a specific device by programming the attachment with a hardware identifier, thus ensuring that the attachment can only be used with that device. In some embodiments, the user may 'pair' an attachment with multiple devices, or change the pairing of an attachment. Also, the system may add authentication layers by utilizing embedded serial numbers, location-based analytics, transaction count mechanisms, and other layers intended to avoid sniffing or otherwise compromising the secure payment capabilities. Also, the system may lock the attachment or otherwise prevent some or all functionality if the attachment disconnected from an audio jack.

In an exemplary embodiment, software on the mobile device may be partially or wholly locked or disable if the attachment is removed or unpaired. For example and not by way of limitation, a user may not be permitted to make a certain higher-risk financial transaction, such as a balance transfer, without the attachment plugged in. In this way, the attachment may be used as an added layer of physical security for operations on the mobile device.

The connection between the mobile device and attachment may serve to transmit power sufficient to power the NFC antenna, the secure element, or any part of the attachment or the entire attachment through the audio jack/plug of the mobile device. Also, the connection may include a process to provision a secure element through audio jack/plug. Also, the connection may include a process for binding an audio jack/plug to one or more specific phone identifiers i.e. UDID (Unique Device ID).

In an exemplary embodiment, the system may enable Industry Standard NFC Payment Transmission. For example, the attachment may enable two loop antennas to form an air-core transformer when placed near one another by using magnetic induction. The system may operate at 13.56 MHz or any other acceptable frequency. Also, the attachment may provide for a passive communication mode, where the initiator device provides a carrier field, permitting answers by the target device via modulation of existing fields. Additionally, the attachment may also provide for an active communication mode by allowing alternate field generation by the initiator and target devices.

In an exemplary embodiment, the attachment may deactivate the RF field while awaiting data. The attachment may use Miller-type coding with varying modulations, including 100% modulation. The attachment may also use Manchester coding with varying modulations, including a modulation ratio of 10%. Additionally, the attachment may be capable of receiving and transmitting data at the same time, as well as checking for potential collisions when the transmitted signal and received signal frequencies differ.

In an exemplary embodiment, the attachment may be capable of utilizing standardized transmission protocols, for example but not by way of limitation, ISO/IEC 14443 A/B, ISO/IEC 18092, MiFare, FeliCa, tag/smartcard emulation, and the like. Also, the attachment may be able to utilize transmission protocols and methods that are developed in the future using other frequencies or modes of transmission. The attachment may also be backwards-compatible with existing payment techniques, for example RFID. Also, the system may support transmission requirements to meet new and evolving payment standards including internet based transmission triggered by NFC. In one embodiment, the attachment in conjunction with the software may utilize PayPass or PayWave systems to enable transactions.

In one embodiment, the attachment may include a magnetic stripe reader for intaking data from credit cards, debit cards, gift cards, loyalty cards, identification cards, and any other object utilizing a magnetic stripe.

In an exemplary embodiment, the attachment may be used to provide offers to a user. These offers may be related to transactions made with the attachment, and may include discounts, advertising, coupons, or any other offer. The offers may also be based on transaction history, frequency, or location. The offers may also be based on a user's indicated desires or the location of a user. Information related to the offer may be received from the NFC antenna or over any other data connection. For example, a user could use the attachment to purchase a pair of pants and the attachment and software, alone or in combination with a point of sale (PoS) device could present an advertisement or offer to purchase a matching shirt, belt, and/or socks. The PoS device may transmit purchase information to the attachment, which may then transmit the information to the phone. The software may utilize the phone's data connection to download additional information or offers. As an example and not by way of limitation, the software may automate post-transaction purchases via an online merchant—(e.g. cables from an online retailer may be promoted or offered following a purchase at a large retail store), and optionally provide a user an option to select a related product the user would like to purchase from a list of options—this may provide a reduced merchandise selection that is presumably more relevant. Additionally, the offers may be selected by incorporating information from other sources, for example using previously shown offers, past user transactions, consumer preference settings, geographic travel patterns, or any other information. The offers may also be presented when transactions are identified through other methods, such as using scanned receipts, photographs of a purchased products, downloaded transaction records, or other ways to identify a product or service purchased by a user. The software may further present a display the effect of an offer to a user's statement in real-time, or either before or after the offer is accepted or rejected.

In an exemplary embodiment, the software in conjunction with the attachment may present information to a user. Also, the information may be related to a recent transaction. In some embodiments, the software may present a related or complementary product advertisement. Also, the software may present offers or follow-on pitches related to a purchase or transaction. Additionally, the software may provide budgeting information, credit limit information, alternative warranty offers, and/or alternative purchase terms such as an offer for a payment plan or dynamic term loan for a given purchase. The software may also allow downloads and/or presentation of additional materials related to a transaction, such as receipts, warranty information, and/or product manuals. The software may allow for real-time use of reward points and/or card-linked offers, (e.g. "spend [x] and we'll take [$y] off your credit card statement"), and may allow for a real time message broadcast notifying the user of any savings.

In one embodiment, the software in conjunction with the attachment may provide budgeting functionality. The software may provide real-time information to a user regarding transactions made with the attachment or other transactions, for example, the software may display to a user the amount of money spent in a given category or at a given location.

In an exemplary embodiment, the software and attachment may provide for process for determining an offer of installment lending related to a transaction from the mobile phone. For example, the software and attachment may, when a user makes a transaction, offer the user an installment loan to cover that purchase. This loan may differ from terms of any other credit account the user possesses. The offer may emphasize dynamic loan terms, such as duration, rate, or eligibility based on creditworthiness, including links to credit card statement data and other account information as the basis for underwriting.

In an exemplary embodiment, the software and attachment may allow for social networking functionality. In some embodiments, a user may "check-in" to a location without making a purchase by using the attachment to transmit data to/from a PoS-like "check-in station" at a location. Also, the software may enable social network updates, postings, or other functionality based on a "check-in" or purchase.

In another embodiment, the software and attachment may allow a number of options to a user. For example, the software and attachment may provide a user the option to the user to use Financial institution transaction history; Loyalty cards; On-line mobile commerce; Deals/Offers; Coupons; Gift Cards; Insurance Cards; Store Passwords; Provisioning for other credit cards; Driver's licenses; Peer to Peer payments—tap two attachments together to transfer payment; Check in when you enter the store; Social Media check in, notice of what was bought, etc.; Product information from tapping on an item; Real time display of upsell and cross sell items; Warranty Upsell (optionally utilizing SKU-level data); Manuals for product (optionally utilizing SKU-level data); Receipts (optionally utilizing SKU-level data); and/or Accepting NFC payments.

In an exemplary embodiment, the attachment may not require a PoS system to make an NFC payment. As one example, the attachment may allow a user to make contact with another attachment or like device in order to complete a payment. The attachment may be used in this way to allow the user to make a transaction with a commercial entity or another user. As one example, a user may repay an amount borrowed from another user by "bumping," or bringing two attachments near one another.

In an exemplary embodiment, the NFC attachment may enable the payments through network data transmission over the air or through standard terminal routing. For example, the attachment may use NFC or other mode of communication as a trigger for an internet based payment, wire transfer, electronic funds transfer, or other financial transaction.

In an exemplary embodiment, the attachment may work in conjunction with a token-based payment solution. The token may be transmitted through the above-detailed near field communications method or by any other suitable method, such as barcode or quick response code scanning Closed loop verification may be enabled by allowing a financial institution to both issue the token and approve the transaction. Such embodiments may provide, for example, a token-based, dynamic solution to contactless payments. In various embodiments, the token-based solution could be provided in an online environment, whereby, for example, a mobile device such as a smartphone could receive a token in "real-time" via a communication network. The token-based solution could also be used in an offline manner, whereby a previously-provided token could be used for a certain period of time, regardless of whether the smartphone is connected to a communication network at the time of use. In effect, the tokens could serve as single-use, or limited-use credit card numbers.

The token-based solution could also allow credit-card issuers, for example, or any other token-issuer to set different types of parameters around the token. For example, transaction limits, use limits, time limits, and the like could be applied to the tokens. In other words, exemplary tokens could apply only to transactions of $100 or less, and/or only to 3 separate transactions before it expires, and only for 3 days. The attachment may operate without utilizing tokens.

In an exemplary embodiment, the attachment may be a secure fob that enables a user to pay for an item or items without needing to present a mobile device. A secure fob may include a proximity capability to ensure that a mobile device is within a particular range, thereby eliminating the risk of fraudulent charges on a stolen fob. In such an embodiment, a fob may be disabled if the fob is not paired with the mobile device by virtue of being disconnected and/or physically separated from the mobile device. Accordingly, the secure connection provides security because a stolen or misplaced attachment may not operate absent the proximity connection to the mobile device.

In an exemplary embodiment, a secure attachment or fob may provide a convenient mobile solution with, for example, existing mobile devices while not having to plug the secure attachment or fob into the mobile device. The secure attachment or fob also may include enhanced features that allow a user to locate keys attached to the fob and/or the mobile device. For example, the secure attachment or fob may include a button or like device that can activate a mobile device finder feature in the mobile device. In such an embodiment, the combination of the key/mobile device finder feature and the mobile payment attachment allow for enhancements that each individual feature In an exemplary a secure attachment or fob may include a RSA generator that may be transmitted to, for example, the mobile device to be used in, for example, high risk transactions. Also, an identity contained in the secure attachment or fob may be used by a customer to log into, for example, mobile banking applications associated with the secure attachment or fob.

FIG. 1 depicts an exemplary system 100 for use with the attachment solution for contactless payment. As depicted in FIG. 1, system 100 may include a mobile device 102. Mobile device 102 may be any mobile device capable of executing the software-based solution for contactless payment. For example, mobile device 102 could be an Apple iPhone®, iPod® or iPad®, or any other mobile device running Apple's iOS operating system, any device running Google's Android® operating system, any music player, any device running Microsoft's Windows® Mobile operating system, and/or any other smartphone or like device.

Mobile device 102 may include, for example, a Subscriber Identity Module (SIM) card and an App Processor. A SIM card may be an integrated circuit that securely stores the service-subscriber key (IMSI) used to identify a subscriber on mobile telephony devices (such as mobile phones and computers). Mobile device 102 may connect to attachment 104. This attachment may be by way of a plug-in connection to an audio jack on the mobile device 102. Information may be transmitted from the attachment to the device by encoding the transaction data as audio data and sending through the connection to be received by the mobile device's microphone. Processors within the mobile device may then process the data as appropriate, by decoding the data, encrypting the data, sending the data to a third party, storing the data, or other appropriate operation as needed. The attachment 104 may contain an embedded NFC chip that can send encrypted data a short distance ("near field") to a reader 106 located, for instance, next to a Point of Sale (PoS) device or like retail cash register that enables contactless payments. An app processor (not shown) may enable execution of software applications on mobile device 102. In one embodiment, the app processor may be a computer processor or other processing device adapted for use in a mobile device. In various embodiments, app processor may cooperate with attachment 104 to enable contactless payment using mobile device 102. In various exemplary embodiments, the hardware contained in the attachment 104 may be partially or wholly redundant with the hardware inside the mobile device 102. Reader 106 may then communicate or otherwise transfer the data to and from payment networks 108. This transfer may be performed through a wireless connection, "over-the-air" connection, wired connection, or through standard terminal routing.

Figure 2:
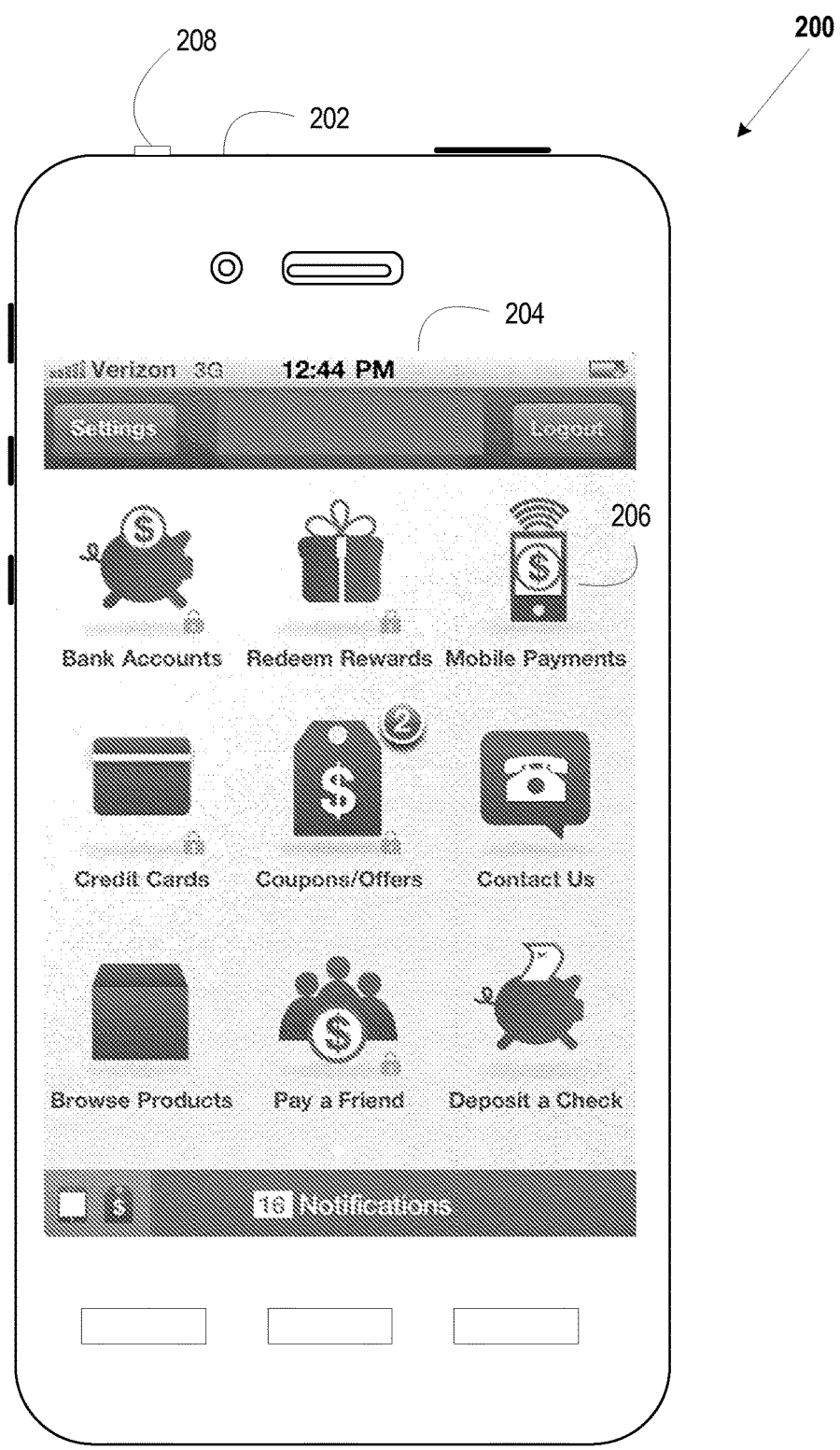
FIG. 2 depicts an exemplary embodiment of a contactless payment system.

FIG. 2 depicts an exemplary system 200 for use with the attachment solution for contactless payment. System 200 may include a mobile device 202. Mobile device 202 may include a display 204 which may display a user interface, including software applications, executing on mobile device 202. By way of a non-limiting example, the software applications executing on mobile device 204 may include a mobile payments application 206. In various exemplary embodiments, mobile payments application 206 may enable a user to interact with and control the attachment. A user may select mobile payments application 206, by for example, touching display 204, which may then launch or otherwise cause the execution of mobile payments application 206. Mobile device may include an audio jack 208. Audio jack 208 may provide the connection for the attachment.

Figure 3:
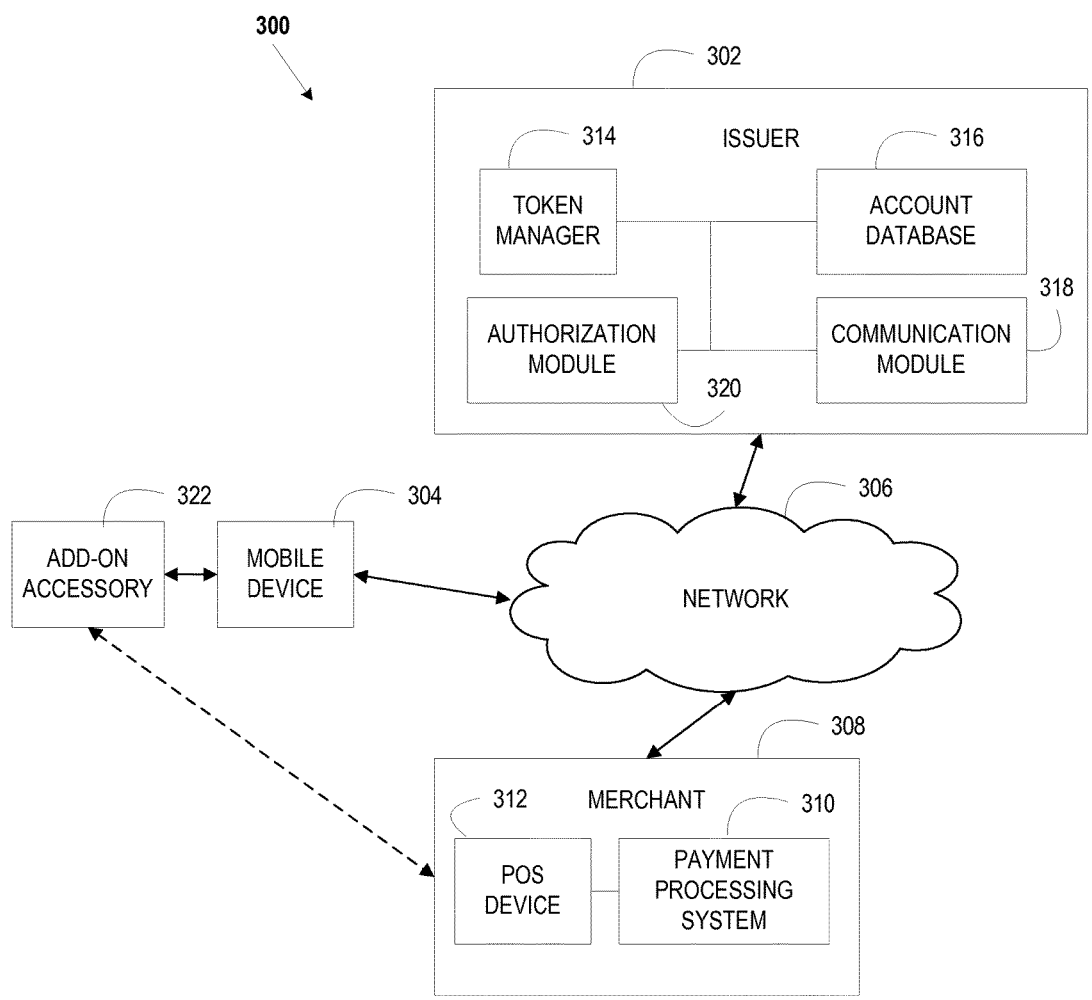
FIG. 3 depicts an exemplary embodiment of a contactless payment system.

FIG. 3 depicts an exemplary system 300 for use with a token-based software solution for contactless payment that may also enable NFC contactless payment. System 300 may include an issuer system 302, a mobile device 304, an attachment 322, a network 306, and a merchant system 308. In various embodiments, mobile device 304 may be similar to those described above with respect to FIGS. 1 and 2.

Network 306 may enable communication between mobile device 304, issuer 302, and merchant 308. For example, Network 306 may be one or more of a wireless network, a wired network or any combination of wireless network and wired network. For example, network 306 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal.

In addition, network 306 may include, without limitation, telephone lines, fiber optics, IEEE Ethernet 902.3, a wide area network ("WAN"), a local area network ("LAN"), or a global network such as the Internet. Also network 306 may support an Internet network, a wireless communication network, a cellular network, or the like, or any combination thereof. Network 306 may further include one network, or any number of the exemplary types of networks mentioned above, operating as a stand-alone network or in cooperation with each other. Network 306 may utilize one or more protocols of one or more network elements to which they are communicatively coupled. Network 306 may translate to or from other protocols to one or more protocols of network devices. Although network 306 is depicted as a single network, it should be appreciated that according to one or more embodiments, network 306 may comprise a plurality of interconnected networks, such as, for example, the Internet, a service provider's network, a cable television network, corporate networks, and home networks.

Issuer system 302 may include, for example, a token manager 314, an account database 316, a communication module 318, and an authorization module 320. Token manager may generate, maintain, and provide information relating to the tokens used in the software-based solution for contactless payments. In various embodiments, token manager 314 may be integrated into issuer system 302 as depicted in FIG. 3. Token manager 314 may also be a third-party system that works in cooperation with issuer system 302 to generate, maintain, and provide tokens for use in the software-based solution for contactless payments. Account database 316 may maintain information relating to the accounts of customers associated with an issuer. As referred to herein, an issuer may include, for example, a credit card issuer, or any other issuer of tokens for contactless payment. These tokens may enable additional security during NFC contactless payment transactions. Account database 316 may also include an association of tokens with respective customers. For example, account database 316 may include an association of a token "123456" with account number "1234 5678 9012 3456," which belongs to John Q. Cardholder. As will be described in more detail below, account database 316 may be accessed for authorizing transactions and or payment requests.

Communication module 318 may enable communication between the components of system 300. Communication module 318 may include hardware, software, and firmware that may enable communication between an issuer system 302 and other components of system 300 using network 306, for example.

Authorization module 320 may include business logic used to determine whether a transaction or payment request should be authorized. For example, authorization module 320 may include executable programs that determine whether the token is associated with the correct mobile device and/or issuer account and whether the token use is within the limiting parameters before authorizing a particular transaction. Authorization module 320 may cooperate with communication module 318 to communicate authorization decisions to merchant 308 and/or mobile device 304.

Merchant 308 may include a Point of Sale (PoS) device 312 and a payment processing system 310. In various embodiments, PoS device 312 may be any device that may receive NFC communication, for example and can be utilized to process payment transactions. PoS device 312 may be for example, PoS devices made by VeriFone® and/or any other like devices. PoS device 312 may permit transmittal, provisioning, issuance, or other similar action with a number of different programs, for example, loyalty and rewards programs, advertising programs, promotional programs, gift programs, etc. For example, PoS device 312 may enable two loop antennas to form an air-core transformer when placed near one another by using magnetic induction. The system may operate at 13.56 MHz or any other acceptable frequency. Also, PoS device 312 may provide for a passive communication mode, where the initiator device provides a carrier field, permitting answers by the target device via modulation of existing fields. Additionally, PoS device 312 may also provide for an active communication mode by allowing alternate field generation by the initiator and target devices.

In an exemplary embodiment, PoS device 312 may deactivate the RF field while awaiting data. PoS device 312 may use Miller-type coding with varying modulations, including 100% modulation. PoS device 312 may also use Manchester coding with varying modulations, including a modulation ration of 10%. Additionally, PoS device 312 may be capable of receiving and transmitting data at the same time, as well as checking for potential collisions when the transmitted signal and received signal frequencies differ.

In an exemplary embodiment, PoS device 312 may be capable of utilizing standardized transmission protocols, for example but not by way of limitation, ISO/IEC 14443 A/B, ISO/IEC 18092, MiFare, FeliCa, tag/smartcard emulation, and the like. Also, PoS device 312 may be able to utilize transmission protocols and methods that are developed in the future using other frequencies or modes of transmission. PoS device 312 may also be backwards-compatible with existing payment techniques, for example RFID. Also, the system may support transmission requirements to meet new and evolving payment standards including internet based transmission triggered by NFC.

Payment processing system 310 may allow merchant 308 to request and process payments, for example. Payment processing system 310 may utilize network 306 to communicate payment requests to issuer system 302 and receive authorization requests. In doing so, payment processing system 310 may transmit information to issuer system 302 using, for example, networks maintained by Visa®, MasterCard®, Discover®, American Express® and the like. Also, payment system 310 may be capable of communicating token information using data standards defined by the above-described networks. To make a payment with the system, a user may place the attachment 104 near the PoS device 312, thus enabling data transmission via NFC.

Figure 4:
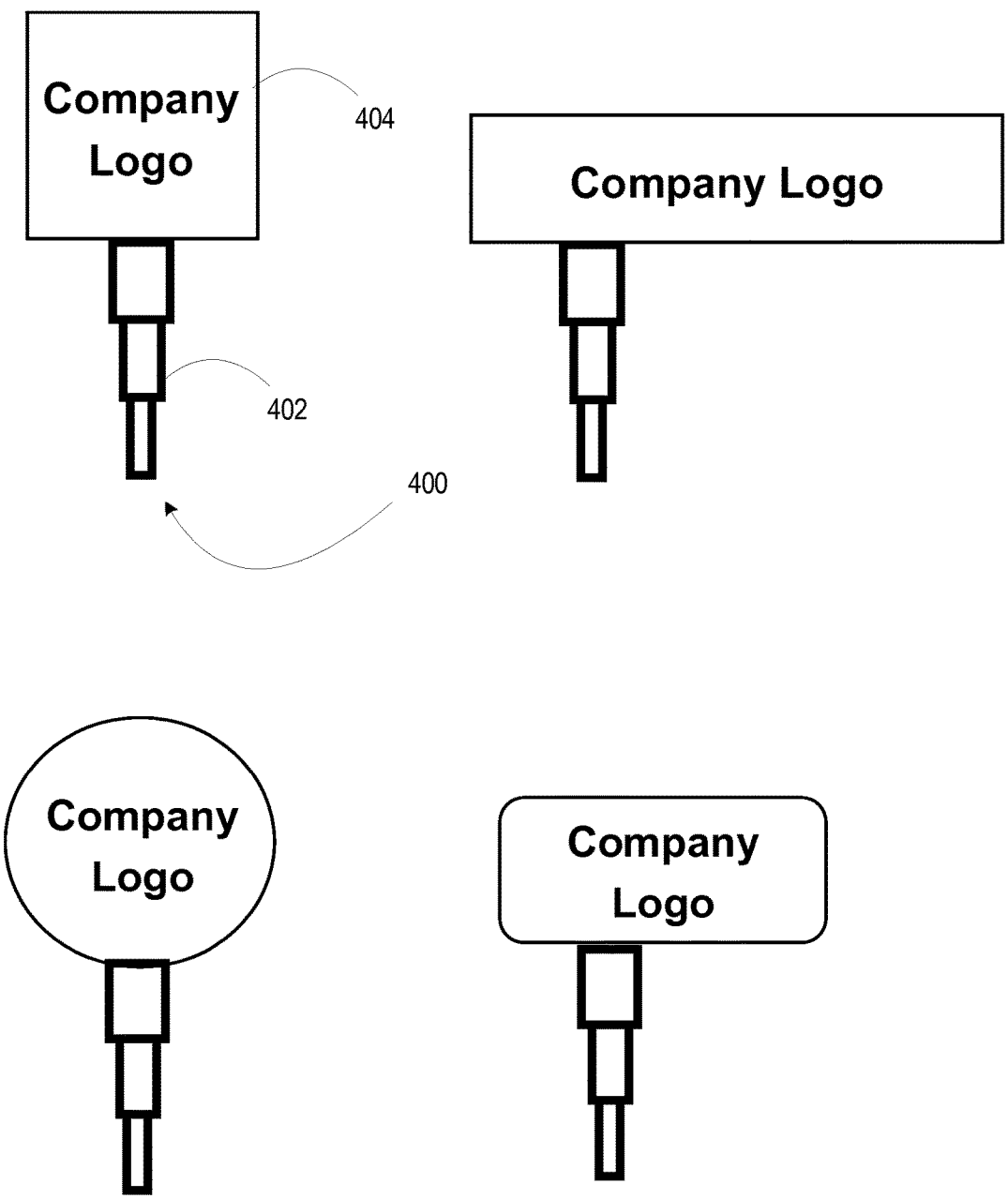
FIG. 4 depicts an exemplary embodiment of a contactless payment system.

FIG. 4 depicts an several exemplary attachments for use with the attachment solution for contactless payment. In one embodiment shown, the attachment 400 may contain a plug 402 and a housing 404. The plug 402 may be adapted to plug into a standard and/or universal audio jack, and may further be configured to transmit and receive data.

Figure 5:
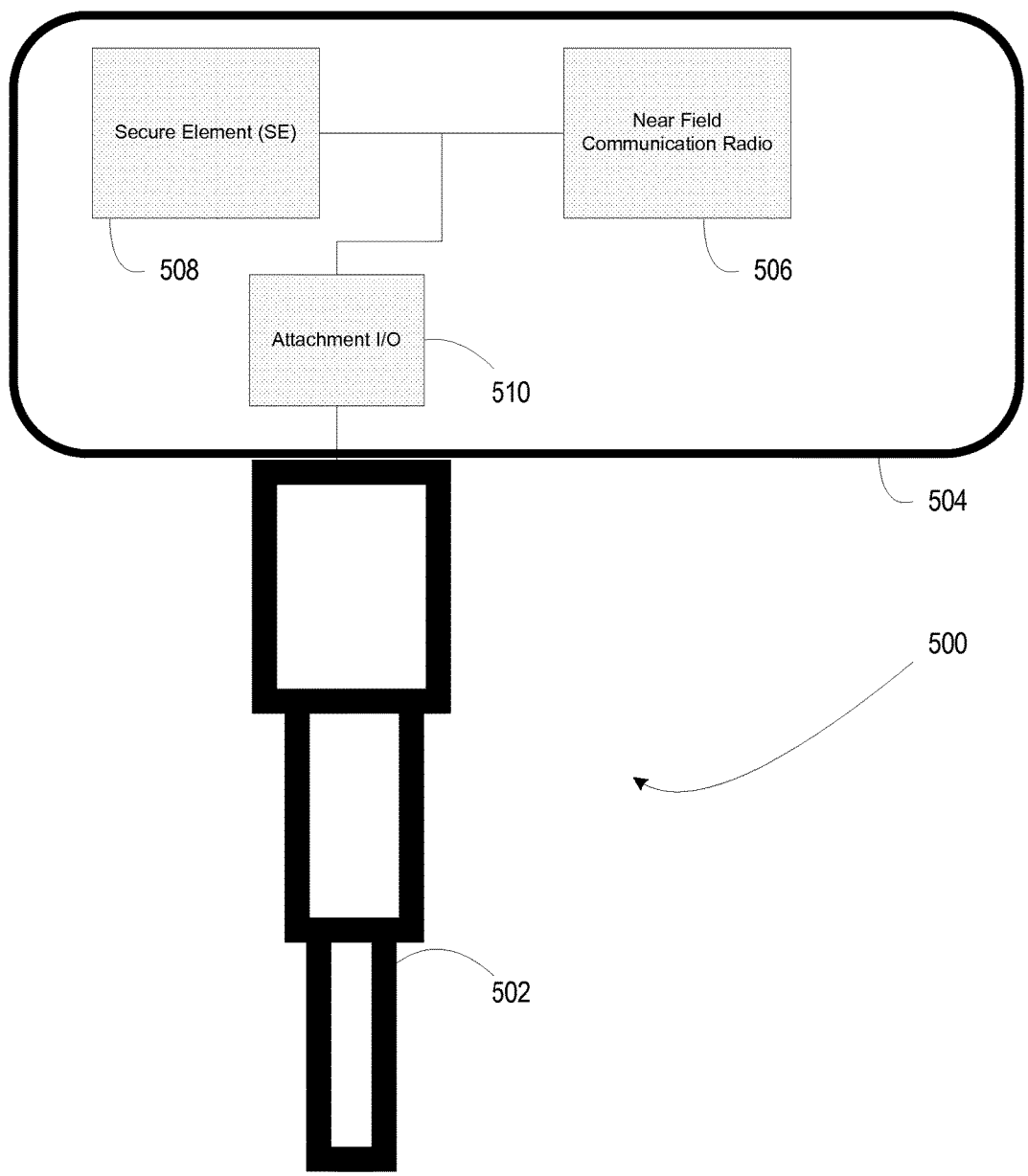
FIG. 5 depicts an exemplary embodiment of a contactless payment system.

FIG. 5 depicts one possible embodiment of the attachment 500. The attachment may comprise an audio jack plug 502 and a housing 504. The housing 504 may be produced from plastic, metal alloy, or any other suitable substance. The housing 504 may contain a near field communication radio 506, a secure element 508, and an input/output module 510. In one embodiment, near field communication radio 506, secure element 508, and an input/output module 510 may all be combined into one chip, separated onto multiple chips or circuits, or any other possible combination. The near field communication radio 506 and secure element 508 may be connected in parallel, in series, or any other possible combination. The near field communication radio 506 and secure element 508 may each maintain a connection to the input/output module 510 if desired. In various embodiments, only one of near field communication radio 506 and secure element 508 may maintain a connection to the input/output module 510 to enhance security. Near field communication radio 506 may comprise one unit, or a separate antenna and NFC controller. Near field communication radio 506 and secure element 508 may be connected, for example, via a Single Wire Protocol (SWP) interface, S2C interface, etc. Secure element 508 may comprise a universal integrated circuit card (UICC), a secure digital or other memory card, SIM card, microcontroller, or any other possible implementation. The secure element may comprise one or multiple computer processors. The secure element may comprise one or multiple error detection systems, tamperproof storage modules, execution memory modules. Secure element 508 may represent multiple secure elements used to isolate various applications and provide additional security. Secure element 508 may optionally be removable to facilitate ease of use. Input/output module 510 may be capable of decoding audio data for use in the attachment. Input/output module 510 may be capable of encoding standard data for output through the audio jack plug 502. Input/output module 510 may comprise one module or multiple modules, and may be optionally combinable with one or both the secure element 508 and near field communication radio 506. Input/output module 510 may be capable of communicating with the mobile device by using a host controller interface. For example and not by way of limitation, input/output module 510 may use a Java Contactless Communication API (JSR 257), a Java Security and Trust Services API (JSR 177), Security and Trust Services API (SATSA), an ISO/IEC 7816 compatible interface, or any other acceptable means or protocol to communicate with the mobile device or any other component. Additionally, the attachment may provide additional features deemed useful, such as, for example, a display, signal light, speaker, additional input/output mechanisms, or other advantageous features.

Figure 6:
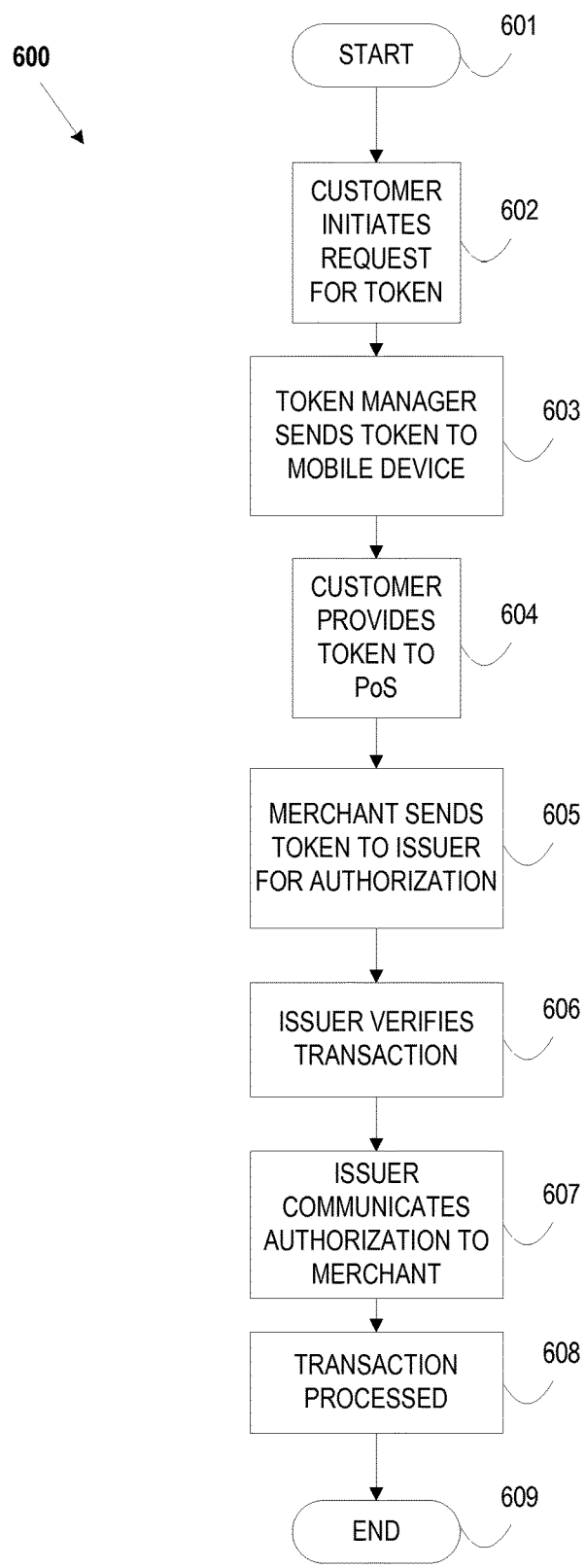
FIG. 6 depicts an exemplary embodiment of a contactless payment method.

FIG. 6 depicts an exemplary method 600 for an approach to contactless payment. Method 600 utilizes tokens to enable contactless payment, and may be used in conjunction with the attachment, or may not be used at all. Note that the attachment and any other items described herein do not require the use tokens and tokens may optionally be used. Method 600 may begin in block 601.

In block 602, a customer may initiate a request for a token. In various embodiments, a customer may "tap" the mobile device and attachment to a PoS device, for example to initiate the request for a token at the time of a transaction. A customer may also initiate a request by requesting a token through a mobile payments application using a mobile device. Also, the token used in FIG. 6 may be account information that would normally be transferred in a simple credit card swipe transaction, already stored in the attachment, and the request may be handled within the attachment and mobile device environment.

In block 603, the token may be sent to a customer's mobile device. For example, a token manager may send a token to mobile device using a communication network and/or various communications similar to those described in FIG. 3. Also, the transfer of the token may be handled within the attachment and mobile device environment.

In block 604, a customer may provide the token to a PoS device. This token could be provided at the time of purchase. Upon receipt of the token, the merchant, using a payment processing system, for example, in cooperation with the PoS device, may format the token into a data format that may be utilized by one of the various authorization networks. For example, an exemplary 6-digit token may be inserted into one of the "tracks" of data utilized by the Visa® network to transmit and receive data. As noted above, the token provided may also represent simple account information such as the information that would be transferred by a credit card swipe transaction.

In block 605, the merchant may send the token to the issuer for authorization. For example, the merchant may send a token to the issuer using a communication network and/or various communications similar to those described in FIG. 3. As noted above, the token provided may also represent simple account information such as the information that would be transferred by a credit card swipe transaction.

In block 606, the issuer and/or token manager may verify the token and/or transaction utilizing the token. For example, the issuer may use the token to look up the account of the customer and determine whether the transaction should be authorized. As noted above, the token provided may also represent simple account information such as the information that would be transferred by a credit card swipe transaction. The issuer and/or token manager may also check the token against certain parameters to determine, for example, whether the transaction complies with certain parameters or the token has expired. In various embodiments, the issuer and/or token manager may receive and utilize location information or identification information associated with the customer's mobile device to determine whether to authorize the transaction. For example, the issuer and/or token manager may receive and utilize the MAC address of a mobile device and/or the merchant location to determine whether to authorize the transaction.

In block 607, the issuer and/or token manager may communicate the authorization to the merchant.

In block 608, the transaction may be processed. At block 609, the method may end.

Figure 7:
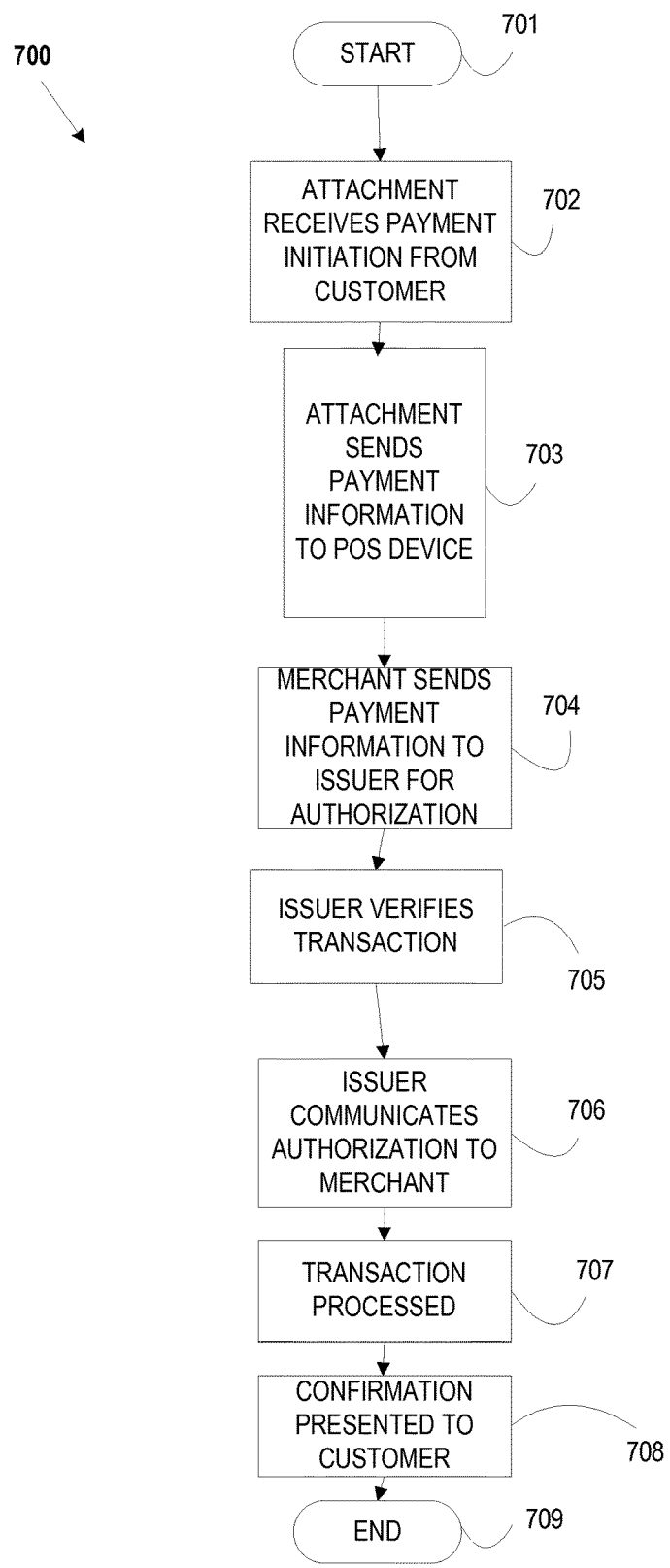
FIG. 7 depicts an exemplary embodiment of a contactless payment method.

FIG. 7 depicts an exemplary method 700 for an approach to contactless payment. Method 700 may begin in block 701.

In block 702, a customer may initiate a payment. In various embodiments, a customer may utilize software on the mobile device to signal that a payment is to be made. For example, the customer may select an option to pay, or the customer may be presented with various options for payment, including, for example, the account the customer desires to use for the transaction, the type of transaction, the amount of the transaction, the time that the attachment should 'wait' for the transaction, and/or the merchant targeted in the transaction. Also, the attachment may be enabled for payments through a button or other interface on the attachment itself, or the attachment may always accept payments without user interaction beyond placing the mobile device and/or attachment near a PoS device or other sensor.

In block 703, the attachment may send payment information to the PoS device via the near field communication techniques described above. In an exemplary embodiment, the payment information may comprise, encrypted information, information similar to that transmitted in a credit card swipe transaction, or a message the payment process is ongoing. The payment information may comprise a dynamic card verification value (CVV3) generated at the time of the transaction. For example, the system may transmit encrypted information representing a customer's account with a financial institution to the PoS device. The payment information transmitted to a PoS device may be a message stating that the transaction is processing, and the mobile device may communicate further information to either the PoS device or another party or device via a non-NFC connection. Upon receipt of the payment information, the merchant, using a payment processing system, for example, in cooperation with the PoS device, may format the payment information into a data format that may be utilized by one of the various authorization networks. For example, the payment information may be inserted into one or more of the "tracks" of data utilized by the Visa® network to transmit and receive data. As noted above, the information provided may also represent simple account information such as the information that would be transferred by a credit card swipe transaction.

In block 704, a merchant may send the payment information to issuer for authorization. For example, the merchant may send a token to the issuer using a communication network and/or various communications similar to those described in FIG. 3. In an exemplary embodiment, the information sent to the issuer may comprise a token as described above, encrypted information representing a financial account, the amount of the transaction, and/or other information necessary to initiate a payment. The information may be sent as received from the attachment/mobile device or may be formatted as described above.

In block 705, the issuer may verify the payment information. For example, the issuer may use the payment information to look up the account of the customer and determine whether the transaction should be authorized. The issuer and/or token manager may also check the payment information against certain parameters to determine, for example, whether the transaction complies with certain parameters or the token has expired. In various embodiments, the issuer may receive and utilize location information or identification information associated with the customer's mobile device to determine whether to authorize the transaction. For example, the issuer may receive and utilize the MAC address of a mobile device and/or the merchant location to determine whether to authorize the transaction.

In block 706, the issuer may communicate the authorization to the merchant. In block 707, the transaction may be processed. The merchant or PoS device may send a payment confirmation message to the attachment.

In block 708, the system may present payment confirmation to the customer. The confirmation may be presented via the display of the mobile device, the speaker of the mobile device, a signal lamp on the mobile device, or by a light or sound message from the attachment itself. The confirmation may comprise a simple notice that the transaction was completed, and may optionally provide information summarizing the transaction, such as, for example, the amount of the transaction, the account used for the transaction, the balance of the account used for the transaction, the merchant name, and/or any other useful information. At block 709, the method may end.

Figure 8:
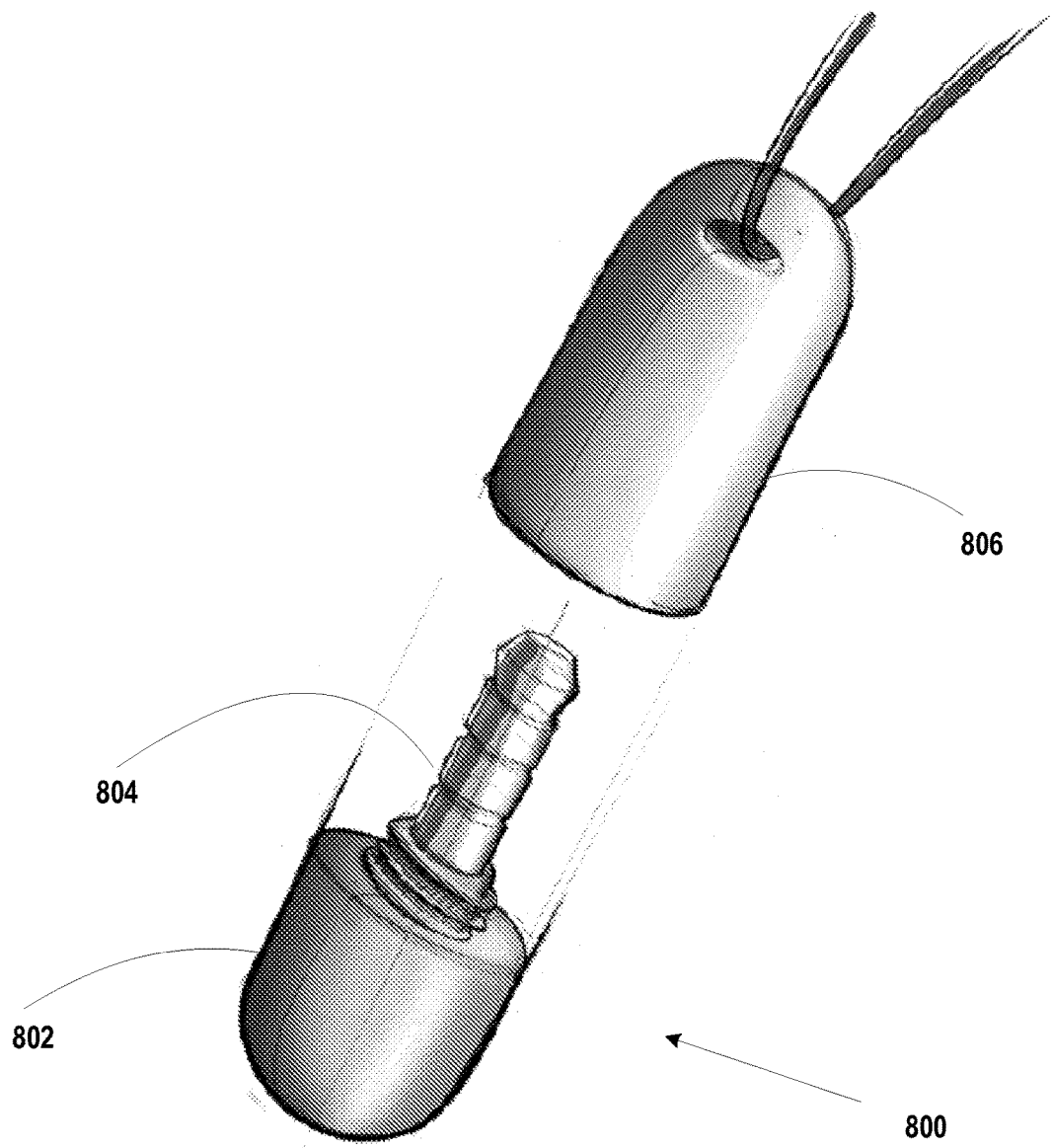
FIG. 8 depicts an exemplary embodiment of a contactless payment system.

FIG. 8 depicts one possible embodiment of the attachment 800. Attachment 800 may comprise an audio jack plug 804 and a housing 802. Attachment 800 may be packaged with or otherwise function with storage unit 806. In an exemplary embodiment, storage unit 806 may comprise a plastic body configured to receive a threaded version of attachment 800. Storage unit 806 may further comprise a hole, loop, or other portion capable of attaching to a keychain, lanyard, or otherwise be carried or held by a user.

Figure 9:
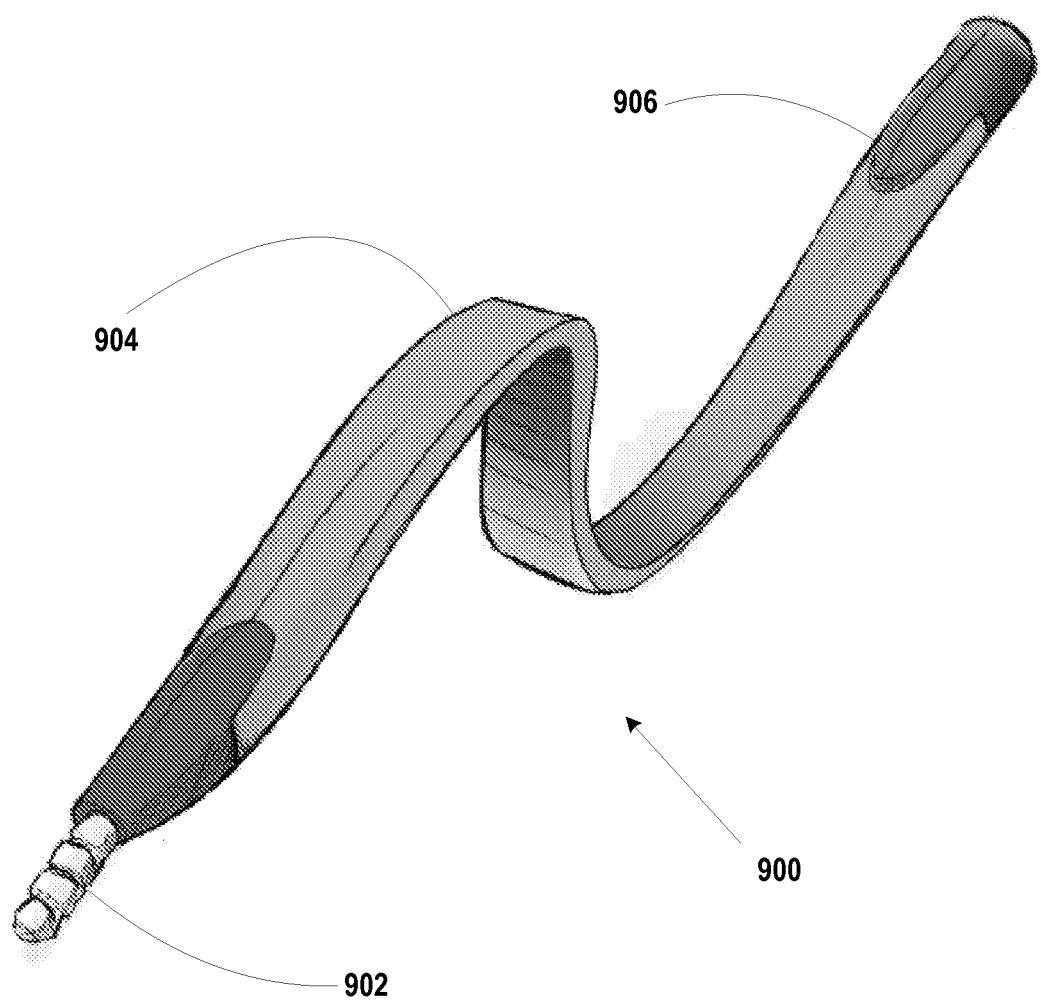
FIG. 9 depicts an exemplary embodiment of a contactless payment system.

FIG. 9 depicts one possible embodiment of the attachment 900. The attachment may comprise an audio jack plug 902, a ribbon 904, and an audio jack 906. Ribbon 904 may contain a near field communication antenna, secure element, and/or an input/output circuit. Attachment 900 may be elongated to mimic or otherwise function in conjunction with existing headphone cords. Audio jack 906 may be configured to receive a headphone audio plug and serve as the user interface of a "pass-through" connection.

Figure 10A:
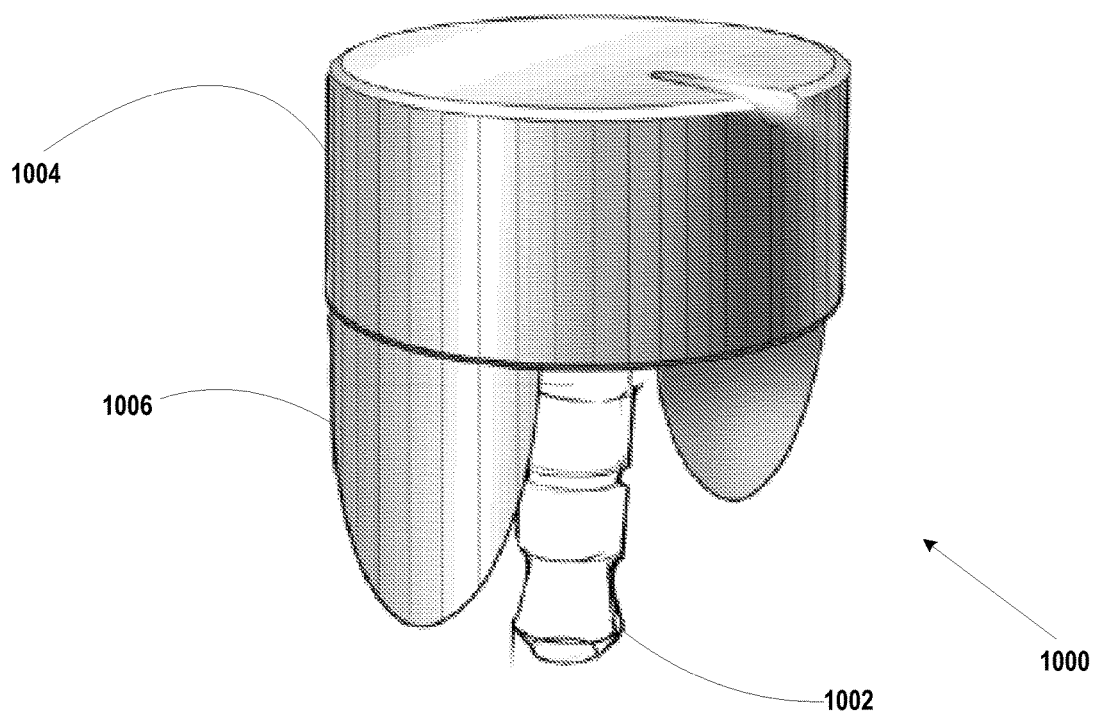
FIG. 10a depicts an exemplary embodiment of a contactless payment system.
Figure 10B:
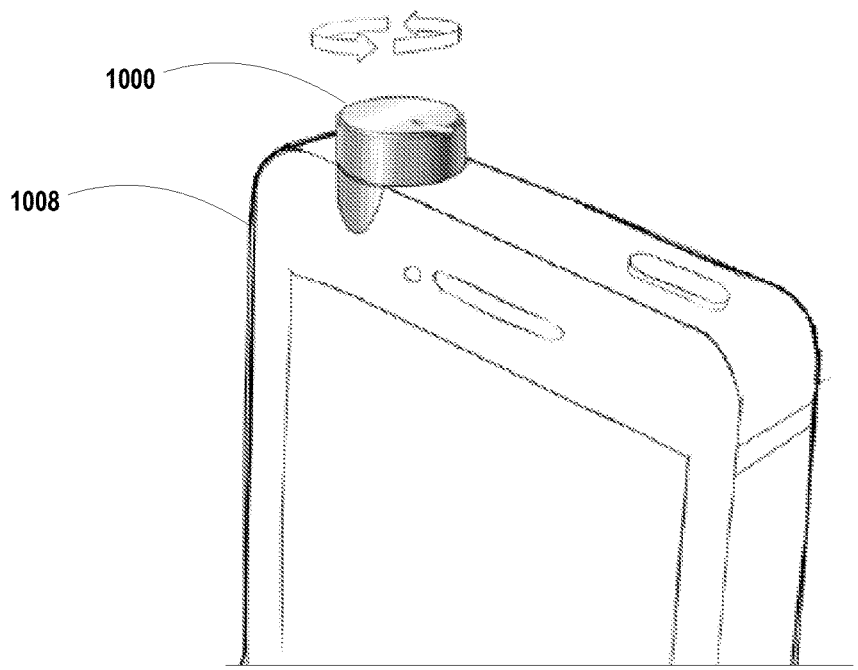
FIG. 10b depicts an exemplary embodiment of a contactless payment system.

FIG. 10A depicts one possible embodiment of the attachment 1000. Attachment 1000 may comprise an audio jack plug 1002 and housing 1004. Housing 1004 may be formed to function as a knob or other movable piece. Housing 1004 may contain an activation circuit comprising a switch or other mechanism capable of sending a signal when housing 1004 is rotated to a certain position or other interaction is completed by a user. Attachment 1000 may optionally have one or more flanges 1006. The one or more flanges 1006 may extend beyond at least one edge of a device 1008 to enable movement or rotation of housing 1004 without moving entire attachment 1000, as shown in FIG. 10B.

Figure 11A:
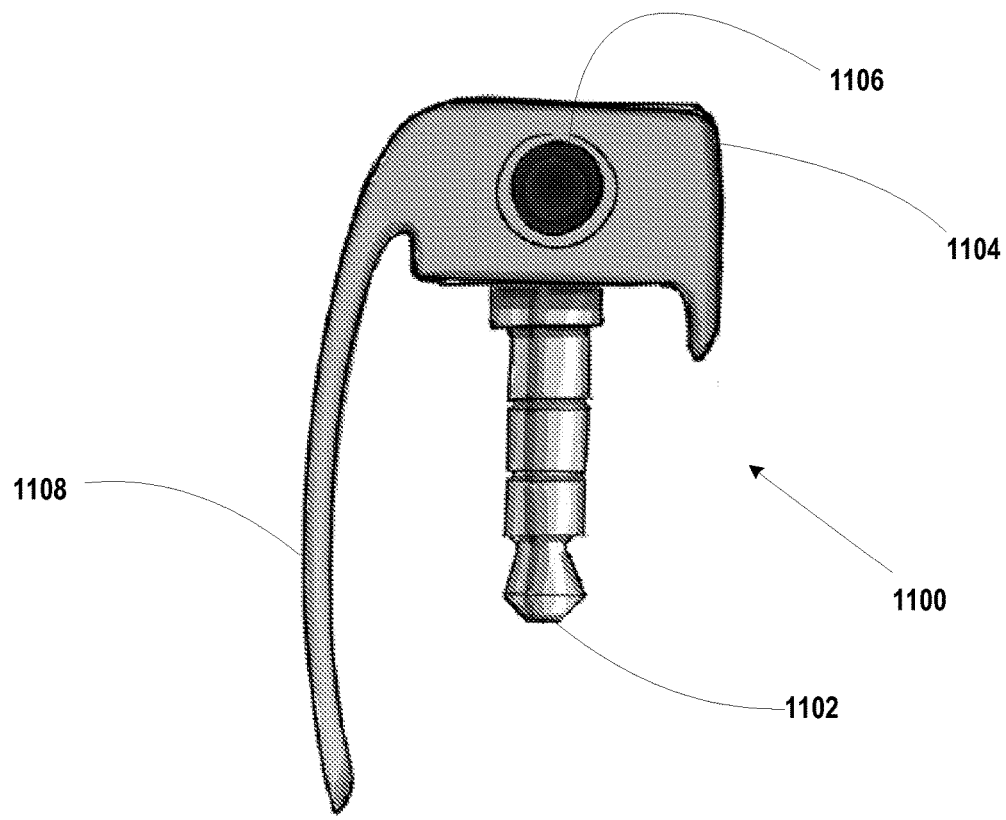
FIG. 11a depicts an exemplary embodiment of a contactless payment system.
Figure 11B:
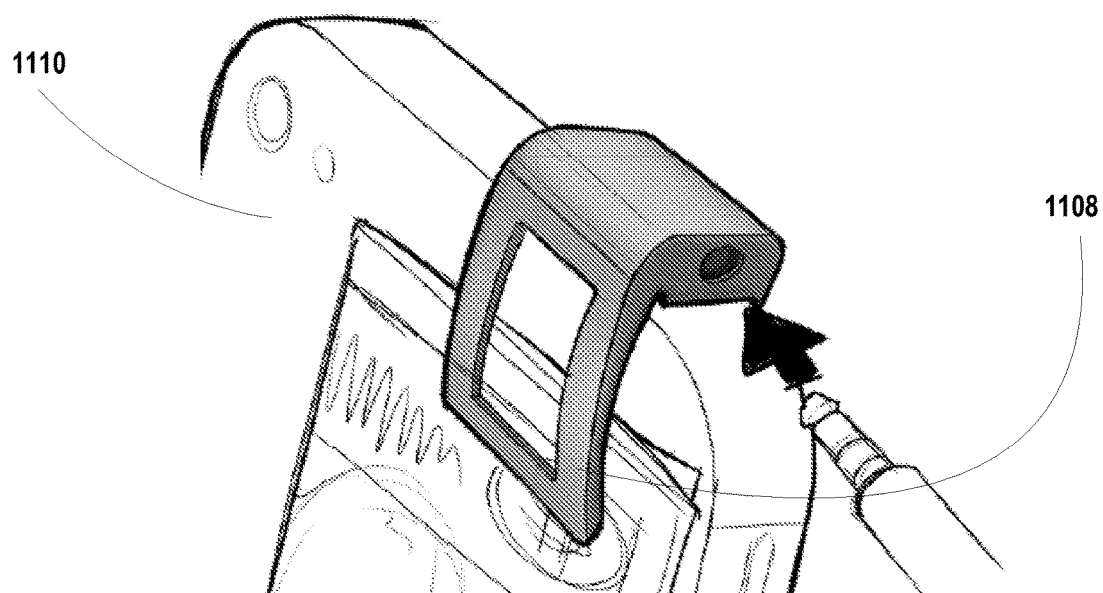
FIG. 11b depicts an exemplary embodiment of a contactless payment system.

FIG. 11A depicts one possible embodiment of the attachment 1100. Attachment 1100 may comprise an audio jack plug 1102, housing 1104, audio jack 1106, and clip extension 1108. Clip extension 1108 may extend beyond one or more edges of device 1110, and function to hold additional objects, cash, cards, or other desirable items, as shown in FIG. 11B.

Figure 12:
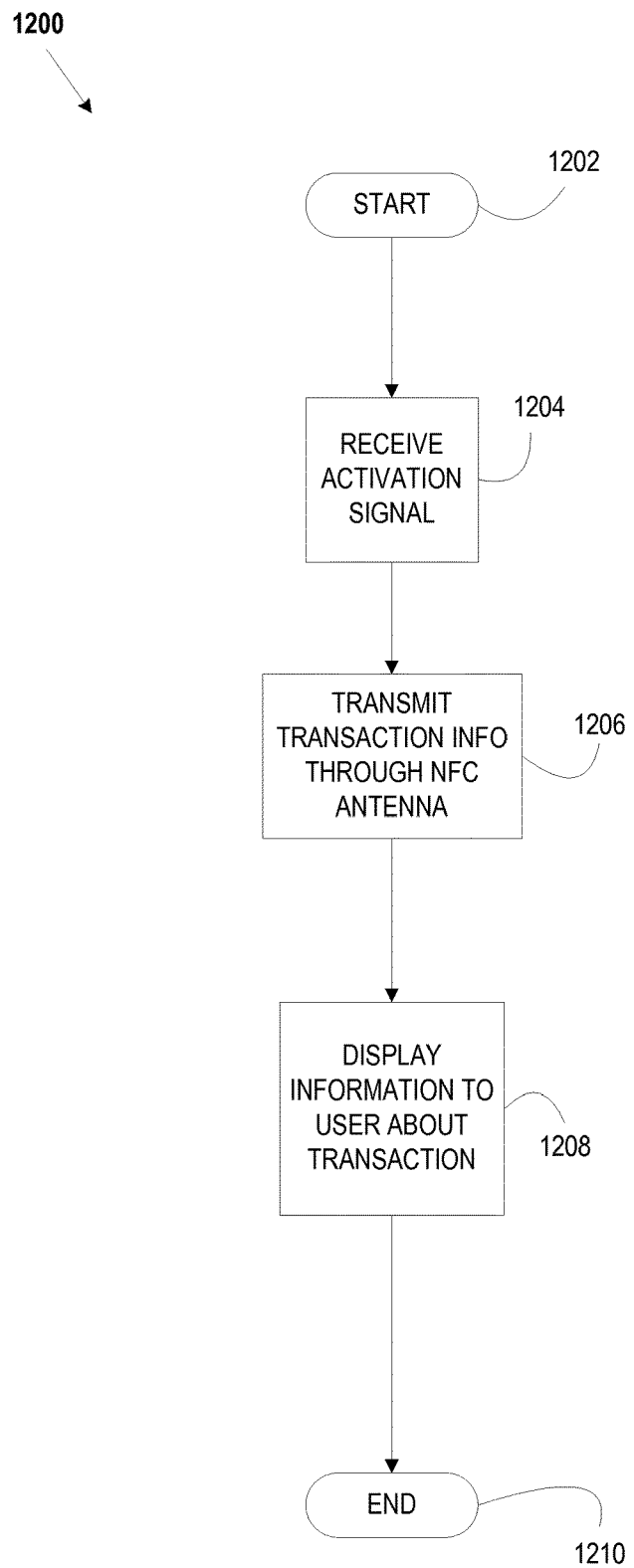
FIG. 12 depicts an exemplary embodiment of a contactless payment method

FIG. 12 depicts an exemplary method 1200 for an approach to contactless payment. Method 1200 may begin in block 1202. In step 1204, an activation signal may be received at one or more computer processors. The activation signal may indicate the entry of a PIN code, the rotation of a knob, the push of a button, a defined switch position, or other signal indicating that the attachment should be activated to complete an operation. In step 1206, transaction information may be transmitted through an NFC antenna. In step 1208, information about the transaction may be displayed to a user on an electronic display. The information may be displayed on any display capable of showing information, for example and not by way of limitation, a liquid crystal display, light emitting diode display, plasma display, organic light emitting diode display, light projection, laser, carbon nanotubes, holographic display, or other segment display, full-area two dimensional display, and/or three dimensional display. Method 1200 may end at step 1210.

Figure 13:
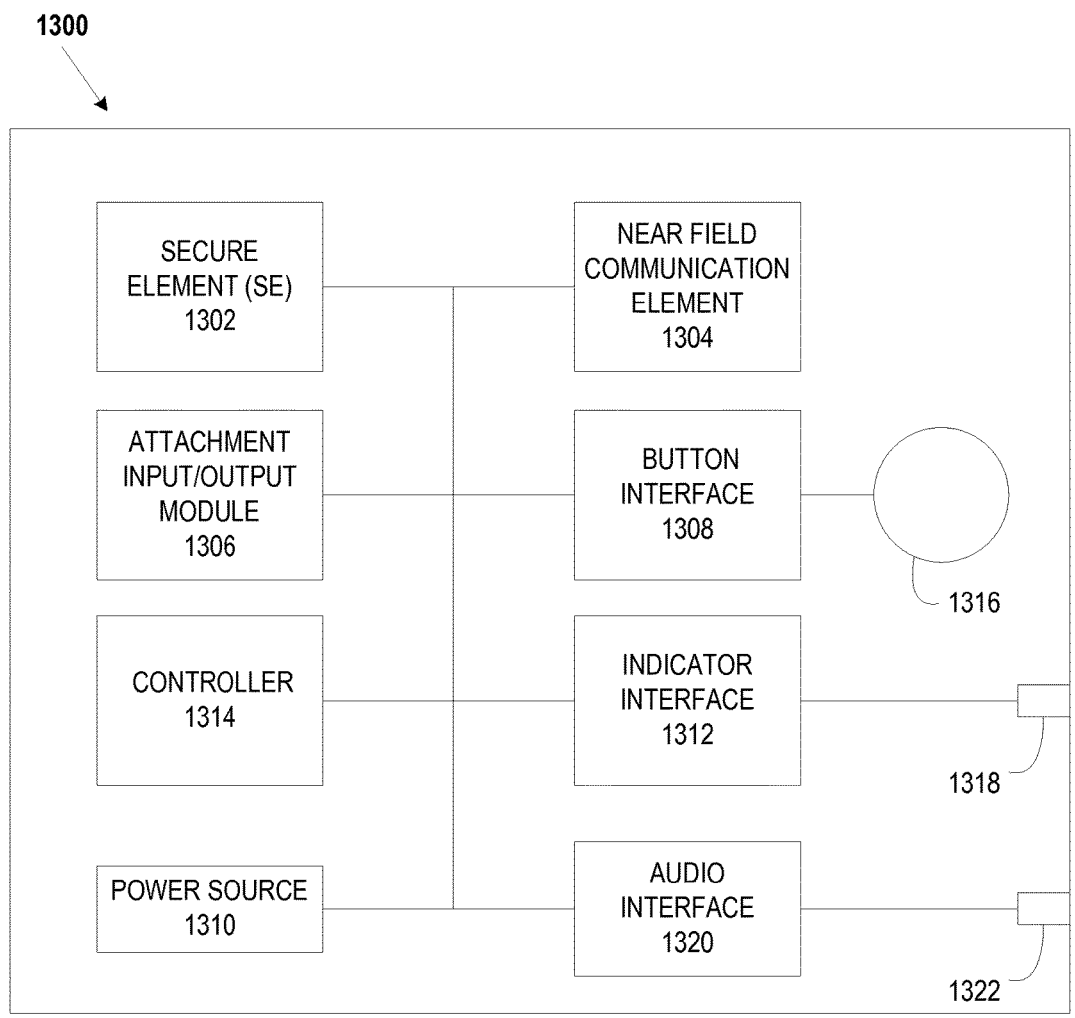
FIG. 13 depicts an exemplary embodiment of a contact payment system.

FIG. 13 depicts an exemplary system 1300 including enhanced features associated with contactless payment. System 1300 may be a secure attachment and/or fob that, for example, may be coupled to a user's key chain or ring. As described in greater detail below, system 1300 may be coupled to a mobile device using, for example a secure, low power wireless technology, such as Bluetooth® Low Energy Technology to enable communication between the system 1300 and a mobile device, such as, for example, mobile device 102. A more detailed explanation of Bluetooth® Low Energy Technology may be found in the Bluetooth® Low Energy Technology Specification version 4.1 and 4.0 and other related Bluetooth® Low Energy specifications, the entire contents of which are incorporated herein by reference.

In various embodiments, the Bluetooth low energy technology may support very short data packets (e.g., 8 octet minimum up to 27 octets maximum) that are transferred at, for example 1 Mbps. The Bluetooth low energy connections may use advanced sniff-sub rating to achieve ultra-low duty cycles. Bluetooth low energy technology also may use the adaptive frequency hopping common to all versions of Bluetooth technology to minimize interference from other technologies in the 2.4 GHz ISM Band. The Bluetooth low energy technology may enable efficient multi-path benefits that increase the link budgets and range. Bluetooth low energy technology also may include intelligence in a controller of the secure attachment or fob 1300, which may allow the host to sleep for longer periods of time and be woken up by the controller only when the host needs to perform some action. This allows for the greatest current savings since the host is assumed to consume more power than the controller. Bluetooth low energy technology also can support connection setup and data transfer as low as 3 ms, allowing an application to form a connection and then transfer authenticated data in few milliseconds for a short communication burst before quickly tearing down the connection. Moreover, Increased modulation index provides a possible range for Bluetooth low energy technology of over 100 meters. Bluetooth low energy technology may use a 24 bit CRC on packets to ensure the maximum robustness against interference. Bluetooth low energy technology may include full AES-128 encryption using CCM to provide encryption and authentication of data packets. Bluetooth low energy technology also may use a 32-bit access address on every packet for each slave, allowing for billions secure attachments or fobs. The Bluetooth low energy technology may be optimized for one-to-one connections while allowing one-to-many connections using, for example, a star topology. With the use of quick connections and disconnections, data can move in a mesh-like topology without the complexities of maintaining a mesh network.

System 1300 may use the secure, low energy connection to enable the enhanced features of a secure attachment, such as, for example, the key and/or mobile device feature. The secure, low energy connection also may be used to transmit, for example, a RSA key to the mobile device to enable a payment transaction or, for example, login into a mobile banking or other application. The secure, low energy connection also may be used to communication with indoor positioning systems, such as, for example Apple iBeacons and the like. For example, a financial institution that issues a secure attachment or fob 1300 may install indoor positioning systems within branch banks or other retail establishments and communicate with the secure attachment or fob 1300 to understand which of its customers have entered into the bank branch or retail establishment.

As shown in FIG. 13, attachment 1300 may include secure element 1302, NFC communication element 1304, attachment input/output module 1306, button interface 1308 which may be connected to a button 1316, controller 1314, indicator interface 1312 which may be connected to an indicator 1318, a power source 1310, and an audio interface 1320 which may be connected to a speaker 1322.

Secure element 1302 may be similar to the secure elements as shown and described above, such as secure element 508. NFC communication element 1304 may be similar to the NFC communication element as shown and described above, such as NFC Radio 506. Attachment input/output module 1306 may be similar to the Attachment input/output module as shown and described above, such as attachment I/O 510. Attachment I/O 1306 also may be capable of wirelessly transmitting low energy secure communications to a mobile device using Bluetooth technology. In various embodiments the attachment input/output module 1306 may not be coupled to an audio plug and instead only communicate wirelessly with a mobile device. In various embodiments, however, as described above, a NFC attachment, such as secure attachment 1300, may include an audio plug as well as a low energy wireless transmitter included within attachment input/output module 1306. Attachment input/output module 1306 may cooperate with other components of attachment 1300, such as, for example, controller 1314 to enable, for example, Bluetooth communication with a mobile device or other low energy transmitter.

Button interface 1308 may include hardware, software, and/or firmware to enable a button 1316 on attachment 1300. For example, a button may include an actuator (not shown) which transmits a signal to button interface 1308 to indicate that button 1316 has been depressed. Button interface 1308 may receive the signal and cooperate with controller 1314 and/or other components of attachment 1300 to perform an instruction associated with button 1316. For example, button interface 1308 may cooperate with controller 1314 and the other components of attachment 1300 to transmit a mobile device locator request to a mobile device, which in turn, will activate an alarm or other like response from a mobile device to indicate the location of the mobile device. Button interface 1308 also may cooperate with controller 1314 and the other components of attachment 1300 to transmit a RSA token to a mobile device which, in turn, may use the RSA token to authorize a transaction, log in to a mobile application and the like.

Power source 1310 may be any power source capable of supplying power to attachment 1300. For example, power source may be a battery, such as a coin cell battery, a photovoltaic cell and the like. Power source 1310 may be a replaceable power source and/or a rechargeable power source. As shown in FIG. 13, power source 1310 may be coupled to the other components of attachments 1300 to supply power to the components of attachment 1300.

Indicator interface 1312 may be coupled to an indicator 1318 to provide status indications to a user of attachment 1300. For example, indicator interface 1312 may operate one or more light-emitting diodes (LEDs) to provide illuminated status indications. In various embodiments, a solid or flashing blue LED indicator 1318 may indicate that attachment 1300 is coupled to another device via a Bluetooth connection. Similarly, a solid or flashing green LED indicator 1318 may indicate that attachment 1300 is communicating with a mobile device and a solid or flashing red LED indicator 1318 may indicate that attachment 1300 is having one or more problems, such as a communication failure, power failure, pairing failure, and the like. Indicator interface 1312 may receive status signals from controller 1314 and/or other components of the attachment 1300, e.g., attachment input/output module 1306 and use those status signals to activate one or more indicators 1318.

Controller 1314 may control the operations of attachment 1300. For example, controller may cooperate with the other components of attachment 1300 to communicate with a mobile device, provide key/mobile device finder features, RSA features and the like. Controller 1314 may be similar to various controllers described above and also may include specific capabilities to enable Bluetooth technology, such as, Bluetooth low energy technology.

Audio interface 1320 may be coupled to a speaker 1322 to enable audio features associated with the attachment. For example, Audio interface 1320 may be coupled to a speaker 1322 to activate an alarm as part of a key finder feature. When for example, the attachment receives a finder request signal from another device, such as, a mobile device via a low energy connection, the audio interface 1320 may receive an alarm signal from, for example, controller 1314, and activate speaker 1322 to notify a user of where the attachment 1300 is located. In various embodiments, speaker 1322 also may operate as a Bluetooth-enabled speaker to provide, for example, convention audio information (e.g., music or like audio signals). In various embodiments, the enhanced features of attachment 1300 may operate while speaker 1322 is operating.

Figure 14:
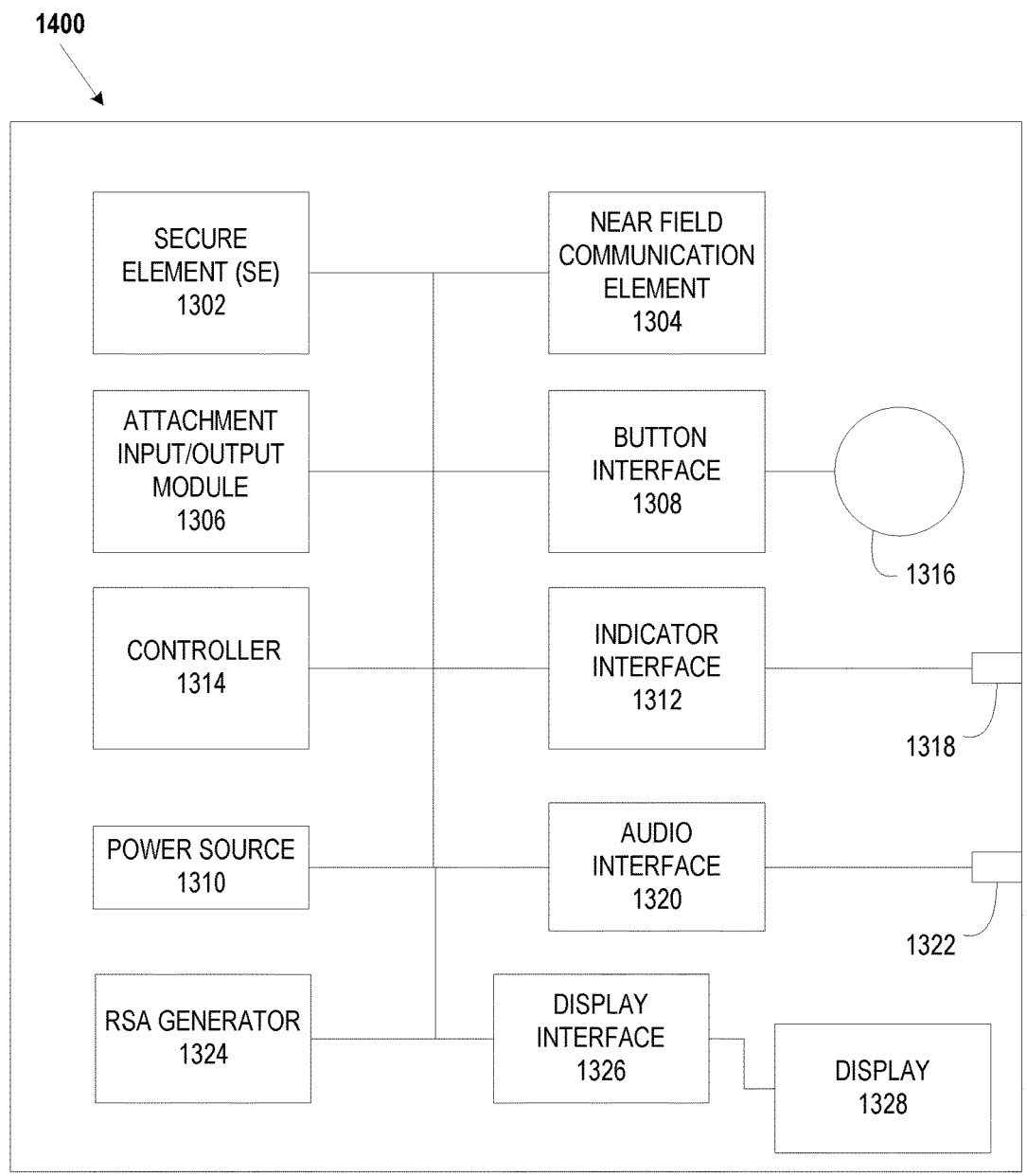
FIG. 14 depicts an exemplary embodiment of a contact payment system.

FIG. 14 illustrates a secure attachment or fob 1400 that may be similar to the secure attachment 1300. Secure attachment 1400 also may include a RSA generator 1324, a display interface 1326, and a display 1328. In various embodiments RSA generator 1324 may generate an encryption key associated with an encryption key pair, such as a private key, to enable enhanced features associated with the attachment 1400. For example, RSA generator 1324 may generate a token code that can be provided to a mobile device or other like device to authorize a login and/or a transaction. In various embodiments, the tokencode automatically be generated and/or may be generated when a user of the attachment depresses button 1316. The RSA tokencode then may be provided via the Bluetooth connection to the mobile device to authorize a transaction through, for example, a native application executing on the mobile device. The tokencode also may be passed to the display interface 1326 to be displayed on display 1328. Once a user observes the tokencode, the user can input the tokencode elsewhere to authorize a transaction and/or a login event.

For example, a user of a native mobile banking application may attempt to conduct a high risk transaction, such as a wire transfer. To ensure the security of the transaction, the user may be required to have the attachment 1400 in close proximity to the mobile device executing the mobile banking application so that the attachment 1400 may transmit via, for example, a Bluetooth connection, the correct RSA tokencode to authorize the transaction. Other embodiments that require the use of the tokencode are contemplated. Moreover, the attachment may be used to provide tokens in various token-based payments described herein.

Display interface 1326 may enable information to be displayed on display 1328. Display 1328 may be a low-power display or other like display. Display 1328 also may be as touch screen display and the like.

Figure 15:
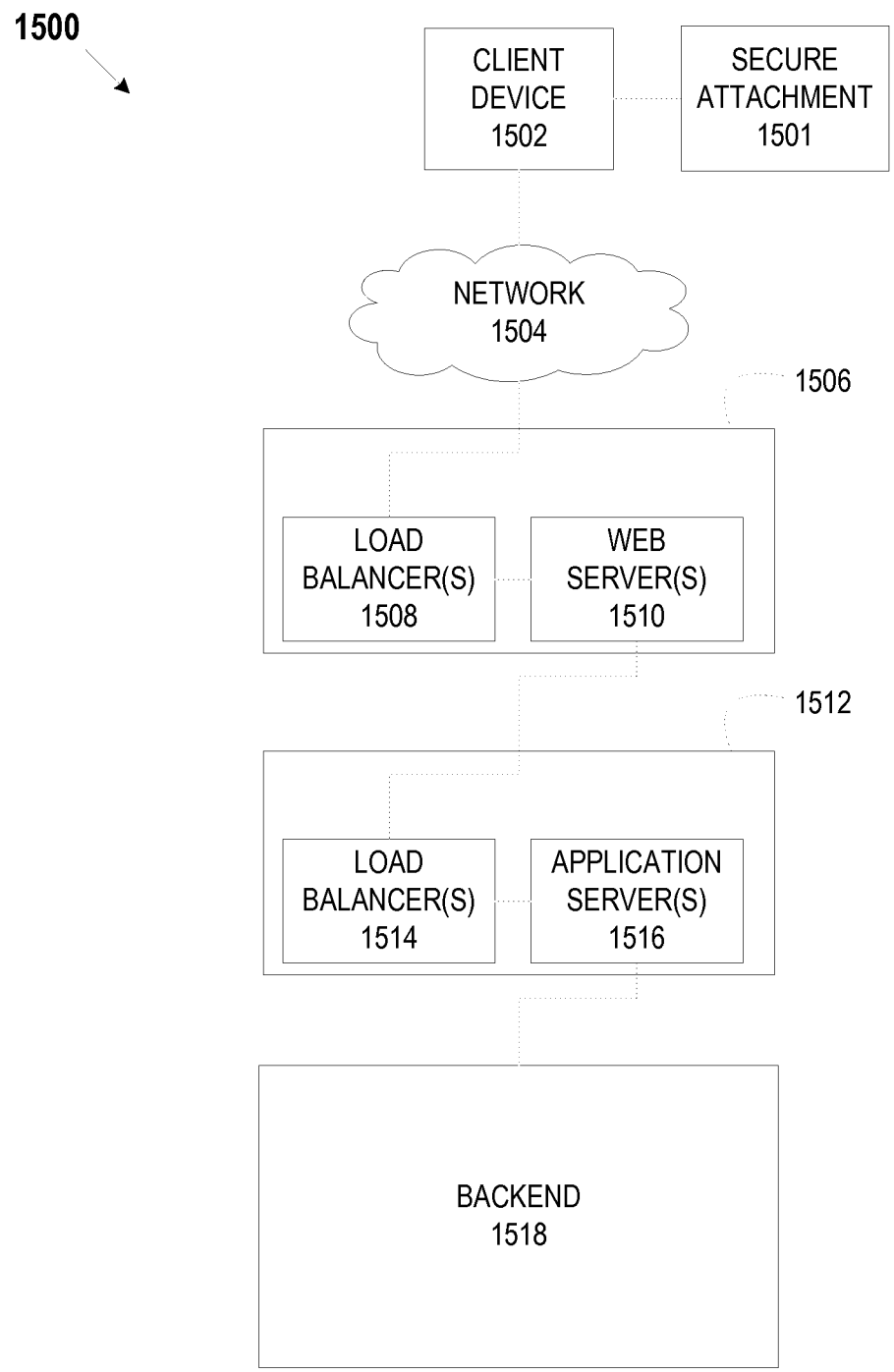
FIG. 15 depicts an exemplary embodiment of a contact payment system.

FIG. 15 depicts an example system 1500 that may enable a financial institution, for example, to provide network services to its customers. As shown in FIG. 15, system 1500 may include a secure attachment 1500, client device 1502, a network 1504, a front-end controlled domain 1506, a back-end controlled domain 1512, and a backend 1518. Front-end controlled domain 1506 may include one or more load balancers 1508 and one or more web servers 1510. Back-end controlled domain 1512 may include one or more load balancers 1514 and one or more application servers 1516.

Secure attachment 1501 may be similar to the NFC attachments shown and described herein. For example, secure attachment 1501 may be similar to secure attachments 500, 1300, and/or 1400. Secure attachment 1501 may be coupled to a client device 1502 via an audio plug and/or a wireless connection (e.g., Bluetooth or other low energy wireless connection).

Client device 1502 may be a network-enabled computer: As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 1500 may execute one or more software applications to enable, for example, network communications.

Client device 1502 also may be a mobile device: For example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device.

Network 1504 may be one or more of a wireless network, a wired network, or any combination of a wireless network and a wired network. For example, network 1504 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 1504 may include, without limitation, telephone lines, fiber optics, IEEE Ethernet 902.3, a wide area network (WAN), a local area network (LAN) or a global network such as the Internet. Also, network 1504 may support an Internet network, a wireless communication network, a cellular network, or the like, or any combination thereof. Network 1504 may further include one network, or any number of example types of networks mentioned above, operating as a stand-alone network or in cooperation with each other. Network 1504 may utilize one or more protocols of one or more network elements to which they are communicatively couples. Network 1504 may translate to or from other protocols to one or more protocols of network devices. Although network 1504 is depicted as a single network, it should be appreciated that according to one or more embodiments, network 1504 may comprise a plurality of interconnected networks, such as, for example, the Internet, a service provider's network, a cable television network, corporate networks, and home networks.

Front-end controlled domain 1506 may be implemented to provide security for backend 1518. Load balancer(s) 1508 may distribute workloads across multiple computing resources, such as, for example computers, a computer cluster, network links, central processing units or disk drives. In various embodiments, load balancer(s) 1514 may distribute workloads across, for example, web server(S) 1516 and/or backend 1518 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 1508 may include software that monitoring the port where external clients, such as, for example, client device 1502, connect to access various services of a financial institution, for example. Load balancer(s) 1508 may forward requests to one of the application servers 1516 and/or backend 1518 servers, which may then reply to load balancer 1508. This may allow load balancer(s) 1508 to reply to client device 1502 without client device 1502 ever knowing about the internal separation of functions. It also may prevent client devices from contacting backend servers directly, which may have security benefits by hiding the structure of the internal network and preventing attacks on backend 1518 or unrelated services running on other ports, for example.

A variety of scheduling algorithms may be used by load balancer(s) 1508 to determine which backend server to send a request to. Simple algorithms may include, for example, random choice or round robin. Load balancers 1508 also may account for additional factors, such as a server's reported load, recent response times, up/down status (determined by a monitoring poll of some kind), number of active connections, geographic location, capabilities, or how much traffic it has recently been assigned.

Load balancers 1508 may be implemented in hardware and/or software. Load balancer(s) 1508 may implement numerous features, including, without limitation: asymmetric loading; Priority activation: SSL Offload and Acceleration; Distributed Denial of Service (DDoS) attack protection; HTTP compression; TCP offloading; TCP buffering; direct server return; health checking; HTTP caching; content filtering; HTTP security; priority queuing; rate shaping; content-aware switching; client authentication; programmatic traffic manipulation; firewall; intrusion prevention systems.

Web server(s) 1510 may include hardware (e.g., one or more computers) and/or software (e.g., one or more applications) that deliver web content that can be accessed by, for example a client device (e.g., client device 1502) through a network (e.g., network 1504), such as the Internet. In various examples, web servers, may deliver web pages, relating to, for example, online banking applications and the like, to clients (e.g., client device 1502). Web server(s) 1510 may use, for example, a hypertext transfer protocol (HTTP or sHTTP) to communicate with client device 1502. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP and web server 1510 may respond with the content of that resource or an error message if unable to do so. The resource may be, for example a file on stored on backend 1518. Web server(s) 1510 also may enable or facilitate receiving content from client device 1502 so client device AO2 may be able to, for example, submit web forms, including uploading of files.

Web server(s) also may support server-side scripting using, for example, Active Server Pages (ASP), PHP, or other scripting languages. Accordingly, the behavior of web server(s) 1510 can be scripted in separate files, while the actual server software remains unchanged.

Load balancers 1514 may be similar to load balancers 1508 as described above.

Application server(s) 1516 may include hardware and/or software that is dedicated to the efficient execution of procedures (e.g., programs, routines, scripts) for supporting its applied applications. Application server(s) 1516 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server (s) 1516 may act as a set of components accessible to, for example, a financial institution or other entity implementing system 1500, through an API defined by the platform itself. For Web applications, these components may be performed in, for example, the same running environment as web server(s) 1510, and application servers 1516 may support the construction of dynamic pages. Application server(s) 1516 also may implement services, such as, for example, clustering, fail-over, and load-balancing. In various embodiments, where application server(s) 1516 are Java application servers, the web server(s) 1516 may behaves like an extended virtual machine for running applications, transparently handling connections to databases associated with backend 1518 on one side, and, connections to the Web client (e.g., client device 1502) on the other.

Backend 1518 may include hardware and/or software that enables the backend services of, for example, a financial institution or other entity that maintains a distributes system similar to system 1500. For example, backend 1518 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, and the like. Backend 1518 may be associated with various databases, including account databases that maintain, for example, customer account information, product databases that maintain information about products and services available to customers, content databases that store content associated with, for example, a financial institution, and the like. Backend 1518 also may be associated with one or more servers that enable the various services provided by system 1500.

Figure 16:
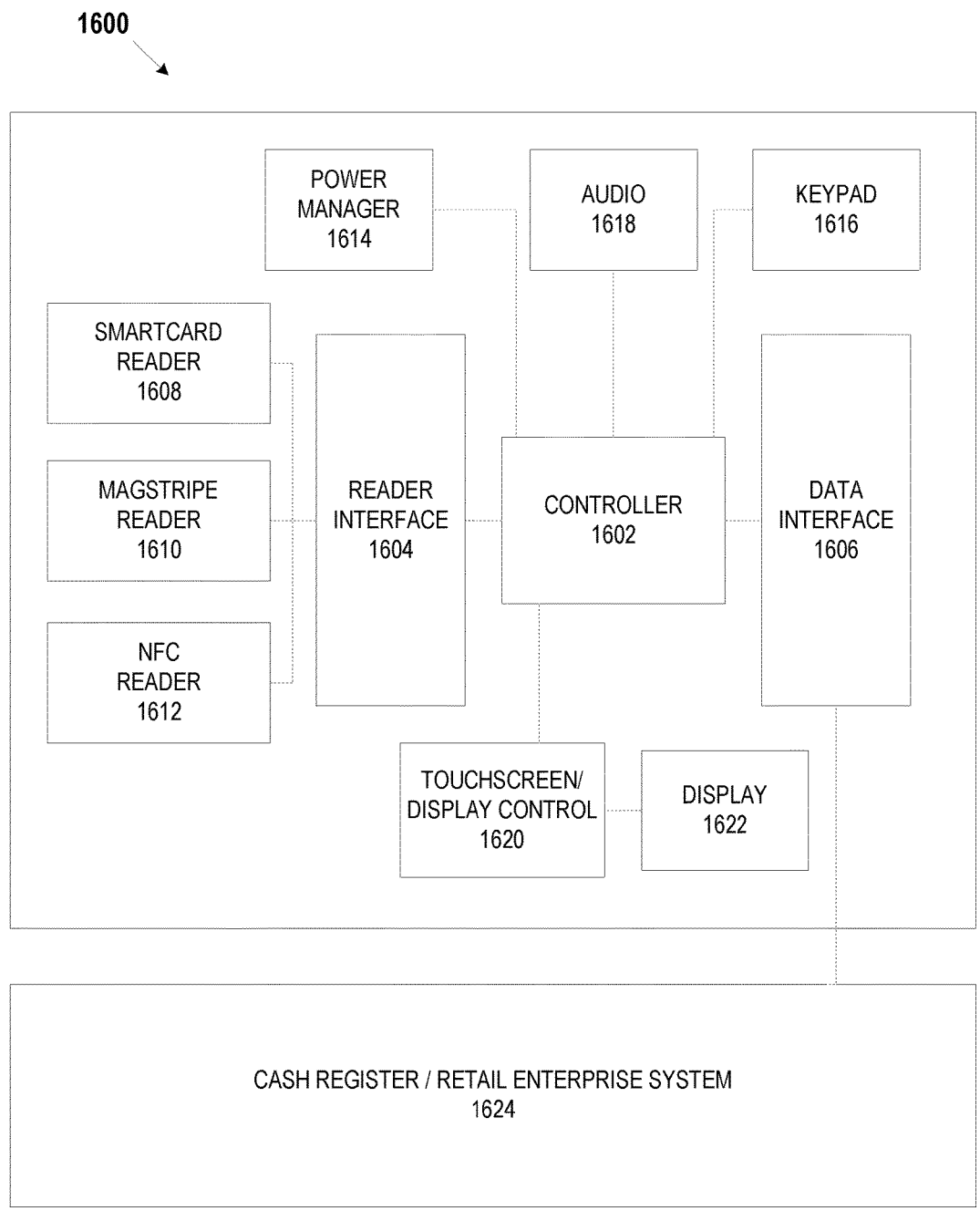
FIG. 16 depicts an exemplary embodiment of a contact payment system.

FIG. 16 depicts an example Point of Sale (PoS) device 1600. PoS device 1600 may provide the interface at what a customer or end user makes a payment to the merchant in exchange for goods or services. PoS device may be similar to PoS device 106 as shown and described above. PoS device 1600 may include and/or cooperate with weighing scales, scanners, electronic and manual cash registers, electronic funds transfer at point of sale (EFTPOS) terminals, touch screens and any other wide variety of hardware and software available for use with PoS device 1600. PoS device 1600 may be a retail point of sale system and may include a cash register and/or cash register-like computer components to enable purchase transactions. PoS device 1600 also may be a hospitality point of sale system and include computerized systems incorporating registers, computers and peripheral equipment, usually on a computer network to be used in restaurant, hair salons, hotels or the like. PoS device 1600 may be a wireless point of sale device similar to a PoS device described herein or, for example a tablet computer that is configured to operate as a PoS device, including for example, software to cause the tablet computer to execute point of sale functionality and a card reader such as for example the Capital One® SparkPay card reader, the Square® reader, Intuit's® GoPayment reader, or the like. PoS device 1600 also may be a cloud-based point of sale system that can be deployed as software as a service, which can be accessed directly from the Internet using, for example, an Internet browser.

Referring to FIG. 16, an example PoS device 1600 is shown. PoS device 1600 may include a controller 1602, a reader interface 1604, a data interface 1606, a smartcard reader 1608, a magnetic stripe reader 1610, a near-field communications (NFC) reader 1612, a power manager 1614, a keypad 1616, an audio interface 1618, a touchscreen/display controller 1620, and a display 1622. Also, PoS device 1600 may be coupled with, integrated into or otherwise connected with a cash register/retail enterprise system 1624.

In various embodiments, Controller 1602 may be any controller or processor capable of controlling the operations of PoS device 1600. For example, controller 1602 may be a Intel® 2nd Generation Core™ i3 or i5 or Pentium™ G850 processor or the like. Controller 1602 also may be a controller included in a personal computer, smartphone device, tablet PC or the like.

Reader interface 1604 may provide an interface between the various reader devices associated with PoS device 1600 and PoS device 1600. For example, reader interface 1604 may provide an interface between smartcard reader 1608, magnetic stripe reader 1610, NFC reader 1612 and controller 1602. In various embodiments, reader interface 1604 may be a wired interface such as a USB, RS232 or RS485 interface and the like. Reader interface 1604 also may be a wireless interface and implement technologies such as Bluetooth, the 802.11(x) wireless specifications and the like. Reader interface 1604 may enable communication of information read by the various reader devices from the various reader devices to PoS device 1600 to enable transactions. For example, reader interface 1604 may enable communication of a credit or debit card number read by a reader device from that device to PoS device 1600. In various embodiments, reader interface 1604 may interface between PoS device 1600 and other devices that do not necessarily "read" information but instead receive information from other devices.

Data interface 1606 may allow PoS device 1600 to pass communicate data throughout PoS device and with other devices including, for example, cash register/retail enterprise system 1624. Data interface 1606 may enable PoS device 1600 to integrate with various customer resource management (CRM) and/or enterprise resource management (ERP) systems. Data interface 1606 may include hardware, firmware and software that make aspects of data interface 1606 a wired interface. Data interface 1606 also may include hardware, firmware and software that make aspects of data interface 1606 a wireless interface. In various embodiments, data interface 1606 also enables communication between PoS device other devices.

Smartcard reader 1608 may be any electronic data input device that reads data from a smart card. Smartcard reader 1608 may be capable of supplying an integrated circuit on the smart card with electricity and communicating with the smart card via protocols, thereby enabling read and write functions. In various embodiments, smartcard reader 1608 may enable reading from contact or contactless smart cards. Smartcard reader 1608 also may communicate using standard protocols including ISO/IEC 7816, ISO/IEC 14443 and/or the like or proprietary protocols.

Magnetic stripe reader 1610 may be any electronic data input device that reads data from a magnetic stripe on a credit or debit card, for example. In various embodiments, magnetic stripe reader 1610 may include a magnetic reading head capable of reading information from a magnetic stripe. Magnetic stripe reader 1610 may be capable of reading, for example, cardholder information from tracks 1, 2, and 3 on magnetic cards. In various embodiments, track 1 may be written on a card with code known as DEC SIXBIT plus odd parity and the information on track 1 may be contained in several formats (e.g., ormat A, which may be reserved for proprietary use of the card issuer; format B; format C-M which may be reserved for us by ANSI subcommittee X3B10; and format N-Z, which may be available for use by individual card issuers). In various embodiments, track 2 may be written with a 5-bit scheme (4 data bits plus 1 parity). Track 3 may be unused on the magnetic stripe. In various embodiments, track 3 transmission channels may be used for transmitting dynamic data packet information to further enable enhanced token-based payments.

NFC reader 1612 may be any electronic data input device that reads data from a NFC device. In an exemplary embodiment, NFC reader 1612 may enable Industry Standard NFC Payment Transmission. For example, the NFC reader 1612 may communicate with a NFC enabled device to enable two loop antennas to form an air-core transformer when placed near one another by using magnetic induction. NFC reader 1612 may operate at 13.56 MHz or any other acceptable frequency. Also, NFC reader 1612 may enable a passive communication mode, where an initiator device provides a carrier field, permitting answers by the target device via modulation of existing fields. Additionally, NFC reader 1612 also may enable an active communication mode by allowing alternate field generation by the initiator and target devices.

In various embodiments, NFC reader 1612 may deactivate an RF field while awaiting data. NFC reader 1612 may receive communications containing Miller-type coding with varying modulations, including 100% modulation. NFC reader 1612 also may receive communications containing Manchester coding with varying modulations, including a modulation ratio of approximately 10%, for example. Additionally, NFC reader 1612 may be capable of receiving and transmitting data at the same time, as well as checking for potential collisions when the transmitted signal and received signal frequencies differ.

NFC reader 1612 may be capable of utilizing standardized transmission protocols, for example but not by way of limitation, ISO/IEC 14443 A/B, ISO/IEC 18092, MiFare, FeliCa, tag/smartcard emulation, and the like. Also, NFC reader 1612 may be able to utilize transmission protocols and methods that are developed in the future using other frequencies or modes of transmission. NFC reader 1612 also may be backwards-compatible with existing payment techniques, such as, for example RFID. Also, NFC reader 1612 may support transmission requirements to meet new and evolving payment standards including internet based transmission triggered by NFC. In various embodiments, NFC reader 1612 may utilize MasterCard's® PayPass and/or Visa's® PayWave and/or American Express'® ExpressPay systems to enable transactions.

Although not shown and described, other input devices and/or readers, such as for example, barcode readers and the like are contemplated.

Power manager 1614 may be any microcontroller or integrated circuit that governs power functions of PoS device 1600. Power manager 1614 may include, for example, firmware, software, memory, a CPU, a CPU, input/output functions, timers to measure intervals of time, as well as analog to digital converters to measure the voltages of the main battery or power source of PoS device 1600. In various embodiments, Power manager 1614 remain active even when PoS device 1600 is completely shut down, unused, and/or powered by the backup battery. Power manager 1614 may be responsible for coordinating many functions, including, for example, monitoring power connections and battery charges, charging batteries when necessary, controlling power to other integrated circuits within PoS device 1600 and/or other peripherals and/or readers, shutting down unnecessary system components when they are left idle, controlling sleep and power functions (on and off), managing the interface for built-in keypad and trackpads, and/or regulating a real-time clock (RTC).

Keypad 1616 may any input device that includes a set of buttons arranged, for example, in a block or pad and may bear digits, symbols and/or alphabetical letters. Keypad 1616 may be a hardware-based or mechanical-type keypad and/or implemented in software and displayed on, for example, a screen or touch screen to form a keypad. Keypad 1616 may receive input from a user that pushed or otherwise activates one or more buttons on keypad 1616 to provide input.

Audio interface 1618 may be any device capable of providing audio signals from PoS device 1600. For example, audio interface may be a speaker or speakers that may produce audio signals. In various embodiments, audio interface 1618 may be integrated within PoS device 1600. Audio interface 1618 also may include components that are external to PoS device 1600.

Touchscreen/display control 1620 may be any device or controller that controls an electronic visual display. Touchscreen/display control 1620 may allow a user to interact with PoS device 1600 through simple or multi-touch gestures by touching a screen or display (e.g., display 1622). Touchscreen/display control 1620 may be configured to control any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, touchscreen/display control 1620 may receive inputs from the touchscreen and process the received inputs. Touchscreen/display control 1620 also may control the display on PoS device 1600, thereby providing the graphical user interface on a display to a user of PoS device 1600.

Display 1622 may be any display suitable for a PoS device. For example, display 1622 may be a TFT, LCD, LED or other display. Display 1622 also may be a touchscreen display that for example allows a user to interact with PoS device 1600 through simple or multi-touch gestures by touching a screen or display (e.g., display 1622). Display 1622 may include any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, 1622 may receive inputs from control gestures provided by a user. Display 1622 also may display images, thereby providing the graphical user interface to a user of PoS device 1600.

Cash register/retail enterprise system 1624 may me any device or devices that cooperate with PoS device 1600 to process transactions. Cash register/retail enterprise system 1624 may be coupled with other components of PoS device 1600 via, for example, a data interface (e.g., data interface 1606) as illustrated in FIG. 16. Cash register/retail enterprise system 1624 also may be integrated into PoS device 1600.

In various embodiments, cash register/retail enterprise system 1624 may be a cash register. Example cash registers may include, for example, mechanical or electronic devices that calculate and record sales transactions. Cash registers also may include a cash drawer for storing cash and may be capable of printing receipts. Cash registers also may be connected to a network to enable payment transactions. Cash registers may include a numerical pad, QWERTY or custom keyboard, touch screen interface, or a combination of these input methods for a cashier to enter products and fees by hand and access information necessary to complete the sale.

In various embodiments, cash register/retail enterprise system 1624 may comprise an retail enterprise system and/or a customer relationship management system. Retail enterprise system 1624 may enable retain enterprises to manage operations and performance across a retail operation. Retail enterprise system 1624 may be a stand-alone application in, for example, individual stores, or may be interconnected via a network. Retail enterprise system 1624 may include various point of sale capabilities, including the ability to, for example, customize and resize transaction screens, work with a "touch screen" graphical user interface, enter line items, automatically look up price (sales, quantity discount, promotional, price levels), automatically compute tax, VAT, look up quantity and item attribute, display item picture, extended description, and sub-descriptions, establish default shipping services, select shipping carrier and calculate shipping charges by weight/value, support multi-tender transactions, including cash, check, credit card, and debit card, accept food stamps, place transactions on hold and recall, perform voids and returns at POS, access online credit card authorizations and capture electronic signatures, integrate debit and credit card processing, ensure optional credit card discounts with address verification, support mix-and-match pricing structure, discount entire sale or selected items at time of sale, add customer account, track customer information, including total sales, number of visits, and last visit date. issue store credit, receive payment(s) for individual invoices, process deposits on orders, search by customer's ship-to address, create and process layaway, back orders, work orders, and sales quotes, credit items sold to selected sales reps, view daily sales graph at the PoS, view and print journals from any register, preview, search, and print journals by register, batch, and/or receipt number, print X, Z, and ZZ reports, print receipts, invoices, and pick tickets with logos/graphics, print kit components on receipt, reprint receipts, enter employee hours with an integrated time clock function, and/or sell when the network/server is down with an offline PoS mode. Retail enterprise system 1624 also may include inventory control and tracking capabilities, reporting tools, customer management capabilities, employee management tools, and may integrate with other accounting software.

In various embodiments cash register/retail enterprise system 1624 may be a hospitality PoS. In such embodiments, retail enterprise system 1624 may include hospitality PoS software (e.g, Aloha PoS Restaurant software from NCR®, Micros® RES and Symphony software and the like), hospitality management software, and other hardware and software to facilitate hospitality operations.

Figure 17:
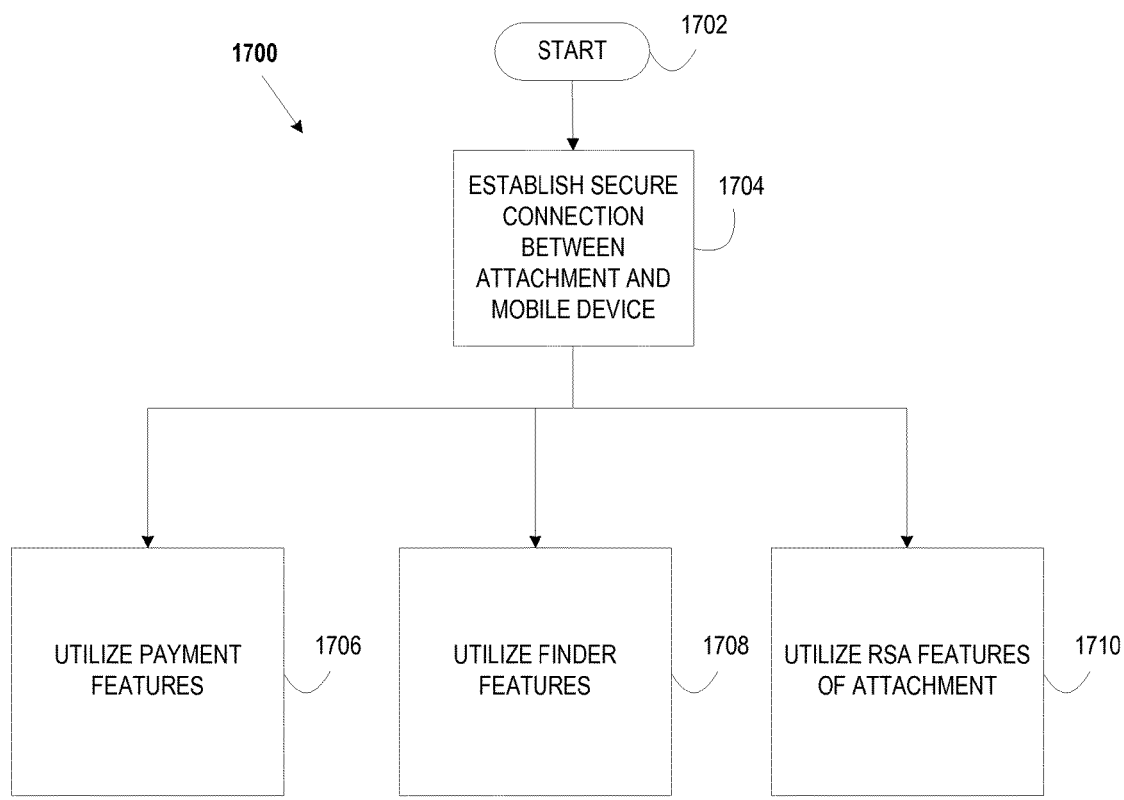
FIG. 17 depicts an exemplary embodiment of a method for using the enhanced features of a contactless attachment.

FIG. 17 depicts an exemplary method 1700 for providing enhanced features for an NFC attachment. Method 1700 may begin in block 1702.

In block 1704, a secure wireless connection may be established. For example, a NFC attachment may establish a Bluetooth low energy connection with a mobile device. In various embodiments, to establish this secure connection, the NFC attachment may be within a certain proximity range of the mobile device to enable the NFC attachment to be paired to the mobile device. A user of the mobile device may be required to input a PIN into, for example, a mobile application operating on the device to establish a secure connection. Also, a user of the NFC attachment may be required to input a tokencode provided by the attachment as explained above to establish the secure connection. Once the secure connection is made, the payment and enhanced features described herein may be enabled. In various embodiments, if the secure connection is not established, the attachment may not operate. Accordingly, the secure connection provides security because a stolen or misplaced attachment may not operate absent the proximity connection to the mobile device.

In block 1706, payments may be made using the NFC attachment. For example, a user may place the secure attachment near a NFC reader on, for example, a PoS device to make a payment. Because the secure attachment is wirelessly connected to a mobile device, the user need not also present the mobile device to the PoS or physically couple the attachment to the mobile device to conduct the transaction.

In block 1708, finder features may be utilized using the attachment. For example, a user of the mobile device may activate a "find my keys" application and/or the like on the mobile device to transmit a signal via, for example, the Bluetooth connection, to activate an alarm on the attachment so as to notify the user of the attachment as to the location of the keys (presuming the attachments is coupled to a key ring). Where the attachment is not coupled to keys, the "find my keys" feature may be used to locate the attachment. In various embodiments, the "finder features" may first establish a wireless connection (assuming the mobile device and attachment are within the requisite proximity of each other) before activating the "finder" features. The user of the attachment also may use, for example, a button on the attachment to find a mobile device that is paired to the attachment. In such an embodiment, the button may transmit a signal to the mobile device to activate an alarm or the like on the mobile device.

In block 1710, the attachment may utilize RSA features. For example, as described above, RSA tokencodes may be transmitted from the attachment to the mobile device to authorize a transaction and/or authenticate the user.

In the preceding specification, various preferred embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. A contactless device, comprising:
   a controller that controls operations of the contactless device;
   a secure element that securely stores an account number that is used to identify an account and is transmitted from the contactless device when processing a secured transaction initiated by a user of a mobile device;
   a secure wireless communication module that establishes a secure wireless connection with the mobile device and enables secure communication between the contactless device and the mobile device;
   a token generator that generates a respective token for each secured transaction, the token enabling additional security for the secured transaction; and
   a button connected to a button interface, the button being configured, upon depression, to initiate transmission of a signal to use the contactless device to locate the mobile device, wherein the button is further configured to initiate transmission of the respective token from the contactless device to the mobile device to authorize the secured transaction, the authorization of the secured transaction being based on whether the token complies with a plurality of parameters and whether the token is associated with the mobile device, the plurality of parameters comprising transaction limits, use limits, and time limits.

2. The contactless device of claim 1, wherein the secure element comprises at least one computer processor and at least one secure storage module.

3. The contactless device of claim 1, further comprising a power source.

4. The contactless device of claim 1, further comprising one or more indicators connected to an indicator interface, the one or more indicators comprising one or more light emitting diodes to provide status indications of the contactless device.

5. The contactless device of claim 1, further comprising a display connected to a display interface.

6. The contactless device of claim 1, wherein the secure element securely stores the account number upon account provisioning, and wherein the secure wireless communication module receives an account provisioning signal that includes the account number.

7. The contactless device of claim 1, further comprising:
   an audio interface and a speaker connected to the audio interface,
   wherein the secure wireless communication module receives a signal from the mobile device, the signal representing an attempt by the mobile device to locate the contactless device, and wherein the audio interface activates the speaker in response to the receipt of the signal by the secure wireless communication module.

8. The contactless device of claim 1, wherein the secure wireless communication module receives a signal from the mobile device, the signal representing an attempt by the mobile device to locate the contactless device, and wherein the contactless device activates location services in response to the received signal.

9. The contactless device of claim 1, further comprising restricting software functionality on the contactless device if the contactless device is disconnected from the mobile device.

10. A method for initializing a contactless device, comprising:
    storing, by a secure element, an account number that is used to identify an account and is transmitted from the contactless device when processing a secured transaction initiated by a user of a mobile device;
    establishing, by a secure wireless communication module, a secure wireless communication channel with the mobile device and enabling secure communication between the contactless device and the mobile device;
    generating a respective token, by a token generator, for each secured transaction being processed, the token enabling additional security for the secured transaction, and
    transmitting, responsive to selection of a button connected to a button interface, a signal to use the contactless device to locate the mobile device, wherein the button is further configured to initiate transmission of the respective token from the contactless device to the mobile device to authorize the secured transaction, the authorization of the secured transaction being based on whether the token complies with a plurality of parameters and whether the token is associated with the mobile device, the plurality of parameters comprising transaction limits, use limits, and time limits.

11. The method of claim 10, wherein the secure element comprises at least one computer processor and at least one secure storage module.

12. The method of claim 10, further comprising restricting software functionality on the contactless device if the contactless device is disconnected from the mobile device.

13. The method of claim 10, further comprising processing the secured transaction relating to the account.

14. The method of claim 10, further comprising:
    receiving, at the secure wireless communication module, a signal from the mobile device, the signal representing an attempt by the mobile device to locate the contactless device, and
    activating location services in response to the received signal.

* * * * *